US011507978B2

(12) United States Patent
Farmer et al.

(10) Patent No.: US 11,507,978 B2
(45) Date of Patent: Nov. 22, 2022

(54) DYNAMIC DISPLAY OF DRIVER CONTENT

(71) Applicant: Beijing DiDi Infinity Technology and Development Co., Ltd., Beijing (CN)

(72) Inventors: Kenneth Farmer, San Francisco, CA (US); Paola Giovanna Piacentini Baruffaldi, Sao Paulo (BR)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 0 days.

(21) Appl. No.: 17/124,343

(22) Filed: Dec. 16, 2020

(65) Prior Publication Data
US 2022/0188866 A1   Jun. 16, 2022

(51) Int. Cl.
G06Q 30/00   (2012.01)
G06Q 30/02   (2012.01)
G06Q 50/30   (2012.01)
G06Q 10/02   (2012.01)

(52) U.S. Cl.
CPC ......... *G06Q 30/0266* (2013.01); *G06Q 10/02* (2013.01); *G06Q 30/0235* (2013.01); *G06Q 30/0255* (2013.01); *G06Q 50/30* (2013.01)

(58) Field of Classification Search
None
See application file for complete search history.

(56) References Cited

U.S. PATENT DOCUMENTS

| 10,013,697 | B1 * | 7/2018 | Cote | B60W 40/09 |
| 11,042,893 | B1 | 6/2021 | Lovett et al. | |
| 11,180,158 | B1 * | 11/2021 | Lyle | B60W 40/09 |
| 2016/0247094 | A1 | 8/2016 | McCaffrey | |
| 2017/0186126 | A1 * | 6/2017 | Marco | G06Q 50/30 |

(Continued)

FOREIGN PATENT DOCUMENTS

| CN | 110782301 A | 2/2020 |
| CN | 111815990 A | 10/2020 |

(Continued)

OTHER PUBLICATIONS

Zoepf, Stephen M., et al. "The economics of ride-hailing: Driver revenue, expenses and taxes." CEEPR WP 5 (2018): 1-38. (Year: 2018).*

(Continued)

*Primary Examiner* — Michael Bekerman
(74) *Attorney, Agent, or Firm* — Knobbe, Martens, Olson & Bear LLP

(57) ABSTRACT

Systems and methods are disclosed configured to identify a location where current or predicted ride requests exceed a threshold within a time period. Driver location information for one or more drivers is used to identify a driver to satisfy the identified current or predicted ride requests at the location that exceed the threshold within the time period. In response to determining that a driver has at least a first likelihood of accepting a ride request at the location within the time period, item content is selected using a history of establishments frequented by the driver. The selected item of content, associated with a token, is provided for presentation on a display to the driver. In response to determining that the identified driver accepted the ride request at the location within the time period, the token is enabled to be utilized by the identified driver at an entity.

17 Claims, 12 Drawing Sheets

(56) References Cited

U.S. PATENT DOCUMENTS

| | | | |
|---|---|---|---|
| 2017/0193625 A1* | 7/2017 | Fan | G06Q 30/0208 |
| 2018/0211348 A1* | 7/2018 | Narayan | H04L 51/52 |
| 2019/0206008 A1* | 7/2019 | Dutta | G06Q 10/063112 |
| 2020/0065842 A1* | 2/2020 | Viswanathan | G06Q 50/30 |
| 2020/0074492 A1* | 3/2020 | Scholl | G06Q 30/0207 |
| 2020/0143409 A1 | 5/2020 | Hollinger et al. | |
| 2020/0173796 A1 | 6/2020 | Beaurepaire et al. | |
| 2020/0226498 A1* | 7/2020 | Jiwani | G06Q 10/02 |
| 2020/0242945 A1 | 7/2020 | Beaurepaire et al. | |
| 2021/0073860 A1 | 3/2021 | SmithAssaly | |
| 2021/0082077 A1* | 3/2021 | Gulati | G06Q 30/0629 |

FOREIGN PATENT DOCUMENTS

| | | | |
|---|---|---|---|
| WO | WO-2019014520 A1 * | 1/2019 | B60W 40/09 |
| WO | WO 2021/097381 A1 | 5/2021 | |
| WO | WO-2021217188 A1 * | 10/2021 | |

OTHER PUBLICATIONS

Henao, Alejandro, and Wesley E. Marshall. "An analysis of the individual economics of ride-hailing drivers." Transportation Research Part A: Policy and Practice 130 (2019): 440-451. (Year: 2019).*
PCT International Search Report and Written Opinion regarding International Application No. PCT/US2021/072569, dated Mar. 15, 2022, 9 pages.

* cited by examiner

DYNAMIC DISPLAY OF DRIVER CONTENT

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

Disadvantageously, conventional routing systems do not display certain route related data relevant to passengers or drivers. In addition, conventional routing systems do not provide an adequate mechanism for having sufficient ride-sharing vehicles at locations of high rider demand.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a computer implemented method of selecting route-related content for display during navigation of a route by a ride sharing vehicle, the method comprising: identifying, using a computer system, a first location where current or predicted ride requests exceed a first threshold within a first time period; using at least driver location information for one or more drivers received over a wireless communication channel, identifying drivers to satisfy the identified current or predicted ride requests at the first location that exceed the first threshold within the first time period; determining, using the computer system, a likelihood that a given identified driver will accept a ride request at the first location within the first time period; at least partly in response to determining that the given identified driver has at least a first likelihood of accepting a ride request at the first location within the first time period, selecting a first item of content to present to the given identified driver, wherein the first item of content is selected based at least in part on a history of establishments frequented by the given identified driver; causing the selected first item of content, the selected first item of content associated with a token, to be presented on a first display to the given identified driver; determining, via a communication received over the wireless communication channel, whether the given identified driver accepted a ride request at the first location within the first time period; and at least partly in response to determining that the given identified driver accepted the ride request at the first location within the first time period, enabling the token to be utilized by the given identified driver at a first entity.

An aspect of the present disclosure relates to a system, comprising: a computing device; a network interface; non-transitory computer readable memory having program instructions stored thereon that when executed by the computing device cause the computing device to: identify a first location where current or predicted ride requests exceed a first threshold within a first time period; use at least driver location information for one or more drivers to identify a driver to satisfy the identified current or predicted ride requests at the first location that exceed the first threshold within the first time period; select a first item of content to present to the identified driver, wherein the first item of content is selected based at least in part on a history of establishments frequented by the identified driver; cause the selected first item of content, the selected first item of content associated with a token, to be presented on a first display to the identified driver; determine whether the identified driver accepted a ride request at the first location within the first time period; and at least partly in response to determining that the identified driver accepted the ride request at the first location within the first time period, enable the token to be utilized by the identified driver at a first entity.

An aspect of the present disclosure relates to a non-transitory computer readable memory having program instructions stored thereon that when executed by a computer system device cause the computer system to performing operations comprising: identify a first location where current or predicted ride requests exceed a first threshold within a first time period; use at least driver location information for one or more drivers to identify a driver to satisfy the identified current or predicted ride requests at the first location that exceed the first threshold within the first time period; select a first item of content to present to the identified driver, wherein the first item of content is selected based at least in part on a history of establishments frequented by the identified driver; cause the selected first item of content, the selected first item of content associated with a token, to be presented on a first display to the identified driver; determine whether the identified driver accepted a ride request at the first location within the first time period; and at least partly in response to determining that the identified driver accepted the ride request at the first location within the first time period, enable the token to be utilized by the identified driver at a first entity.

DETAILED DESCRIPTION

Conventionally, ride-sharing, on demand vehicle services provide ride services to a wide variety of riders, from a wide variety of origination locations to a wide variety of destinations. Such riders may request rides via an application installed on a user device, such as a phone. Disadvantageously, while waiting for a car or during a ride in the vehicle, other than displaying the route itself, the dedicated application fails to provide route-related data that is personalized to the rider and that may be used to provide tokens translatable to real world actions. Further, conventional ride sharing management and routing systems fail to provide adequate ride sharing vehicles to areas of high rider demand, particularly, when such high demand is unanticipated.

Detailed descriptions and examples of systems and methods according to one or more illustrative embodiments of the present disclosure may be found, at least, in the section entitled "Dynamic Generation and Display of Route-Related Content and Enabling Routing of Vehicles to High Demand Locations, as well as in the section entitled Example Embodiments," and also in at least FIGS. 1A-4B herein. Furthermore, components and functionality for the dynamic generation and display of route-related content and enabling routing of vehicles to high demand locations may be configured and/or incorporated into the networked vehicle environment 100 described herein in and with reference to FIG. 1A.

Various embodiments described herein are intimately tied to, enabled by, and would not exist except for, vehicle and/or computer technology. For example, the real time use of wirelessly received sensor data from a vehicle communications array, wirelessly received user geolocation data, wirelessly received vehicle geolocation data, and vehicle routing data to determine whether content is to be transmitted for display to a remote device, selecting content, and/or determining when such content is to be transmitted and/or displayed to the user via a display device described herein in reference to various embodiments cannot reasonably be performed by humans alone, without the vehicle and/or computer technology upon which they are implemented.

Networked Vehicle Environment

Figure 1A:
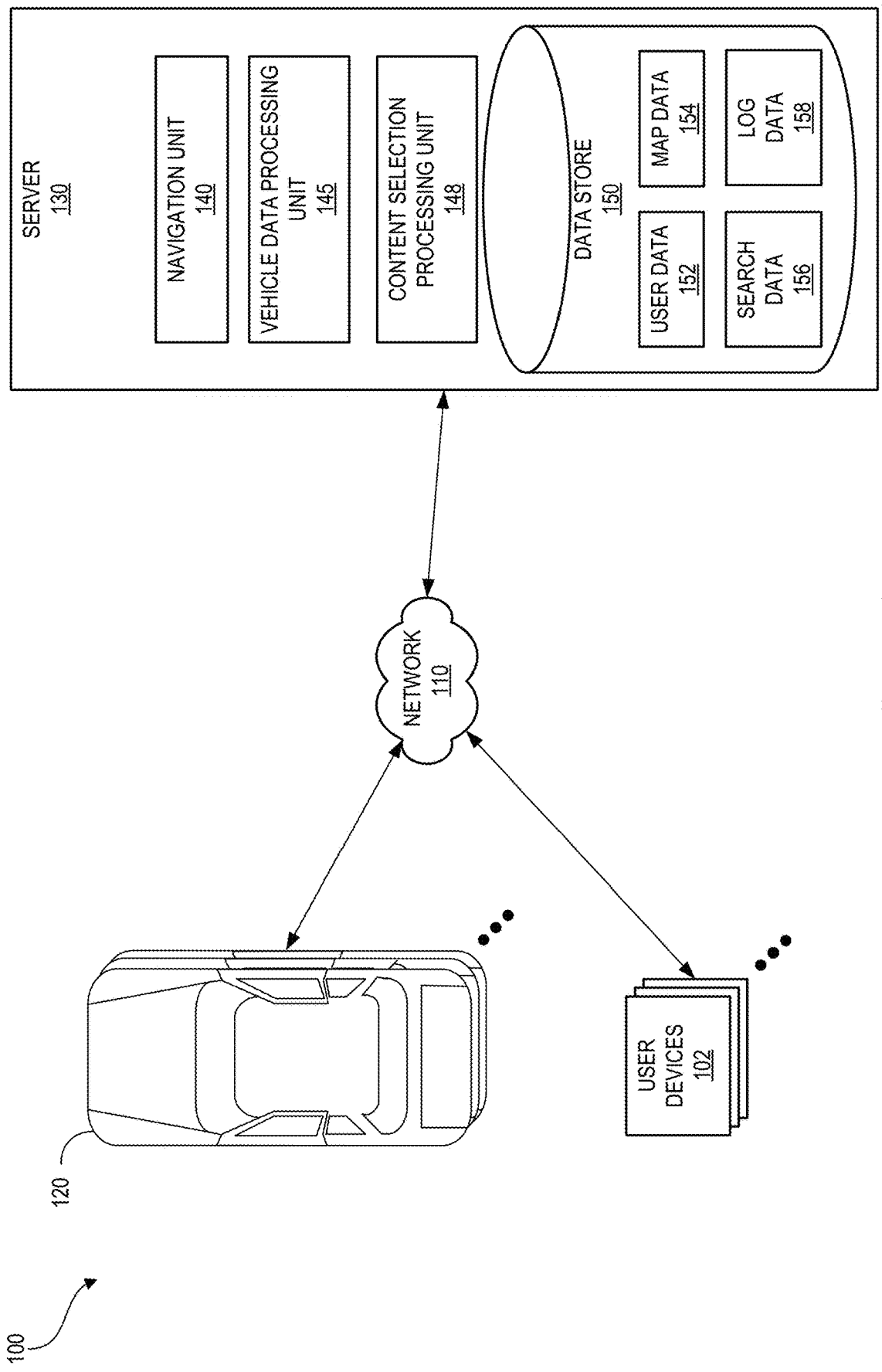
FIG. 1A illustrates a block diagram of a networked vehicle environment in which one or more vehicles and/or one or more user devices interact with a server via a network, according to certain aspects of the present disclosure.

FIG. 1A illustrates a block diagram of a networked vehicle environment 100 in which one or more vehicles 120 and/or one or more user devices 102 interact with a server 130 via a network 110, according to certain aspects of the present disclosure. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data (including content described herein) to the vehicles 120. For example, the server 130 can transmit map data, firmware and/or software updates, vehicle 120 control instructions, an identification of an object that could not otherwise be identified by a vehicle 120, passenger pickup information, traffic data, token data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, smart clothing, smart glasses, or any other device that can communicate over the network 110 with the server 130. A user device 102 can execute an application, such as a mobile application (sometimes referred to as an "app"), that the user operating the user device 102 can use to interact with the server 130 and content received from the server 130. For example, the user device 102 can communicate with the server 130 to provide location data and/or queries to the server 130, to receive map-related data and/or directions from the server 130, tokens, and/or the like.

The server 130 can process requests and/or other data received from user devices 102 to identify service providers (e.g., vehicle 120 drivers) to provide the requested services for the users. Further, the server 130 can receive ride cancellation requests from user devices 102. In addition, the server 130 can receive data—such as user trip pickup or destination data, user location query data, user device GPS location data, etc.—based on which the server 130 identifies a region, an address, and/or other location associated with the various users. The server 130 can then use the identified location to provide services providers and/or users with directions to a determined pickup location, other content (such as that described herein), token, and/or other data.

The application running on the user device 102 may be created and/or made available by the same entity responsible for the server 130 (e.g., via an application "app" store operated by a third party). Alternatively, the application running on the user device 102 can be a third-party application that includes features (e.g., an application programming interface or software development kit) that enables communications with the server 130. The application may optionally be downloaded to the user device 102 from an application store hosted by a third party system.

A single server 130 is illustrated in FIG. 1A for simplicity and ease of explanation. It is appreciated, however, that the server 130 may be a single computing device, or may include multiple distinct computing devices logically or physically grouped together to collectively operate as a server system.

The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. For example, the disclosed processes may be performed in whole or in part by a secure hosted computing environment that includes a collection of physical computing resources that may be remotely accessible and may be rapidly provisioned as needed (sometimes referred to as a "cloud" computing environment). The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Certain protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location" or "origination location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

A content selection processing unit 148 may be configured to determine whether content is to be provided for presentation to a user, to select such content, and to determine when such content is to be transmitted to and/or presented by a device for presentation to a user (e.g., a rider and/or a driver) using, for example, user data accessed from data store 150 and/or log data 158 (e.g., route data, sensor data, perception data, vehicle 120 control data, vehicle 120 component fault and/or failure data, ride quality data, historical traffic data, historical route traversal times, etc.). As described herein, content selection processing unit 148 may include one or more artificial intelligence engines (e.g., one or more learning engines, such as one or more neural networks) that may be used in generating geofences (virtual geographic boundary) and selecting content to be presented to a given user. Optionally, artificial intelligence engines may be trained for users generally, for a specific class of users, or for a specific user.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses (e.g., work and/or home addresses, billing information, data associated with prior trips taken or serviced by a user, user rating information, user loyalty program information, favorite addresses, frequently visited addresses, preferred routes, previously selected points of interest, language settings, and/or the like.

By way of further example, user data 152 for a rider may include the rider's home address, work address, and demographic data (e.g., year of birth, gender identification, income, etc.), food and shopping preferences (e.g., based on the rider's history of using coupons, drop off locations, and manually provided preference data provided by the rider via an electronic preference form), the rider's historical activities (e.g., origination and destination locations of past rides, interactions with route related content presented via a rider device, post-ride rider activities, and/or the like), the rider's current location, a requested destination, and/or date and time of day the ride is requested. By way of further example, user data 152 for a rider may include historical content interaction data (e.g., use of tokens, including information as to where the tokens were used, when the tokens where used, and/or what the tokens where used to acquire). The user data 152 may include some or all of the other rider data disclosed herein.

By way of still further example, user data 152 for a driver may include the driver's home address, work address, the type of vehicle the driver is driving (e.g., a compact car, a midsize car, a large car, a minivan, a small SUV, a medium size SUV, a large SUV, vehicle make, vehicle model, vehicle model year), demographic data (e.g., year of birth, gender identification, income, marriage/partner status, year of birth of spouse/partner, gender identification of spouse/partner, number of children, year of birth of children, gender identification of children, etc.), the driver's ratings by riders, the driver's historical activities (e.g., origination/pickup and destination locations of past rides, typical routes driven by driver, beginning and end times of providing ride sharing services for each day, locations of stops (e.g., rest stops) more than a threshold length of time when not transporting a rider (which may indicate a stop to use a restroom or a meal), times of day the driver stopped at rest stops, weather conditions when the driver provided and/or did not provide ride sharing services, traffic conditions on routes previously driven by driver, interactions with route related content presented via a driver device (e.g., use of tokens, including information as to where the tokens were used, when the tokens where used, and/or what the tokens where used to acquire), and/or food and shopping preferences (e.g., based on the driver's history of using coupons, drop off locations, driver device location data, and manually provided preference data provided by the rider via a preference form).

The user data 152 may optionally include some or all of the other driver data disclosed herein.

Although certain information disclosed herein may be described as rider data or may be described as being used with respect to content selection and presentation timing for riders, where applicable, similar or the same type of information may be used with respect to drivers. Similarly, although certain information disclosed herein may be described as driver data or may be described as being used with respect to content selection and presentation timing for drivers, where applicable, similar or the same type information may be used with respect to riders.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest (e.g., parks, restaurants, fuel stations, attractions, landmarks stores, bathrooms, entertainment venues, etc.), etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turnoffs, points of interest (e.g., parks, restaurants, fuel stations, attractions, landmarks, stores, bathrooms, entertainment venues, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, road condition information (e.g., broken pavement, potholes, speed bumps, etc.), information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle and ride related data provided by one or more vehicles 120 and/or user devices 102. For example, the vehicle and ride related data can include route data, sensor data, perception data, vehicle 120 control data, vehicle 120 component fault and/or failure data, ride quality data (e.g., hard accelerations, hard braking/decelerations, bumps, etc.), historical traffic data, historical route traversal times, destination arrival times, associated ride weather conditions, etc.

Figure 1B:
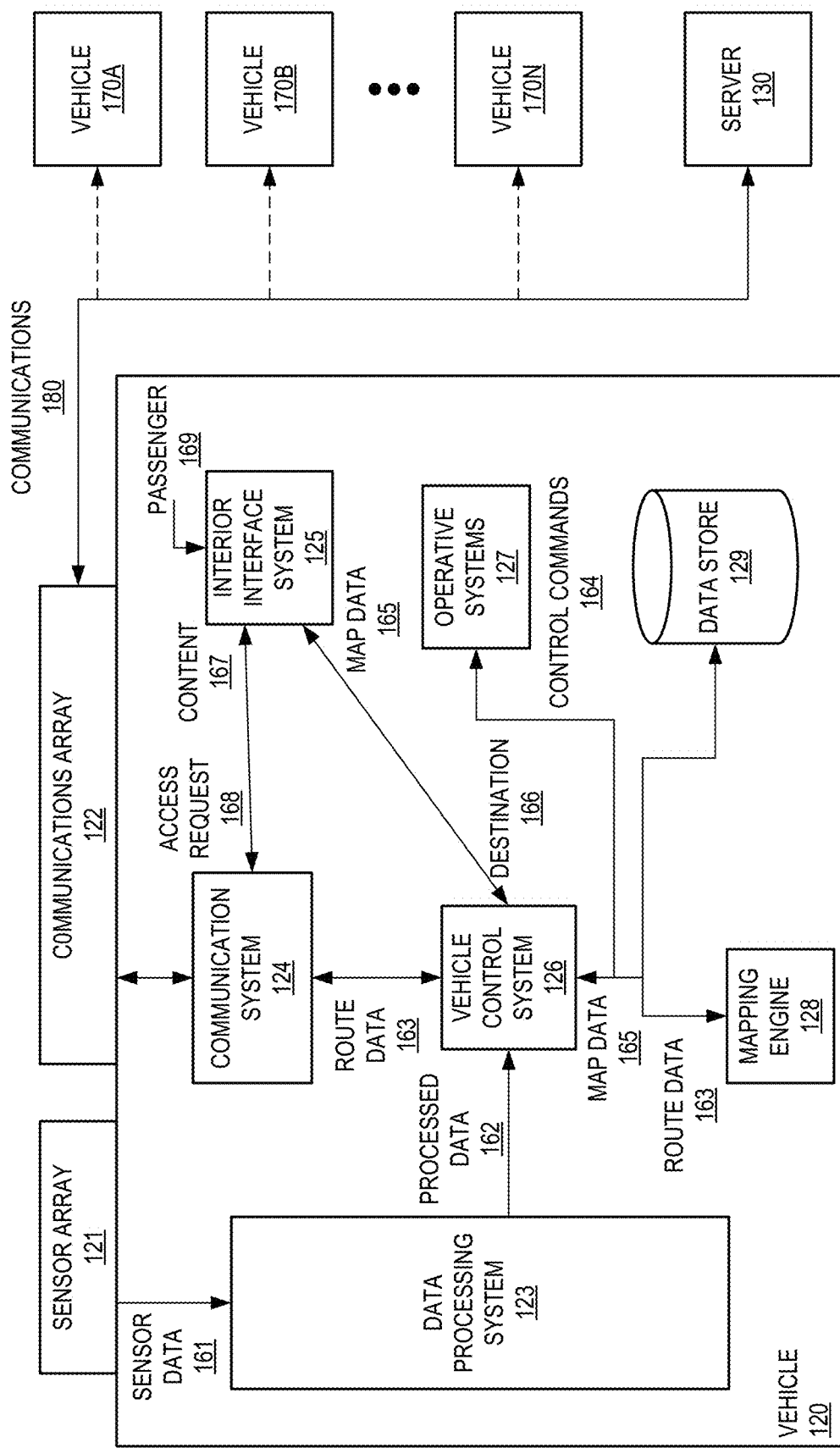
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A-N and/or the server 130 of FIG. 1A, according to certain aspects of the present disclosure. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129. The data store 129 optionally comprises a hosted storage environment that includes a collection of physical data storage devices that may be remotely accessible and may be rapidly provisioned as needed (sometimes referred to as "cloud" storage).

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166 (e.g., via touch using a an interior interface system 125 touch display, via activation of physical buttons/controls of the interior interface system 125, via voice commands provided using a microphone of the interior interface system 125).

The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166 and/or to select content to be transmitted to and presented by a user device 102. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display (e.g., via a vehicle panel display, a segment display, a heads up display, etc.) and/or present instructions for maneuvering the vehicle 120 through traffic to the destination location 166 along the optimal route. Optionally, information and content may also or instead be displayed via a mobile device having a display (e.g., a driver phone or wearable device). Optionally, information and content may also or instead be provided audibly (e.g., via a text to speech system) using a vehicle speaker or a mobile device speaker (e.g., a driver phone speaker or wearable device speaker).

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection, such as a Wi-Fi connection or a Bluetooth). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access (e.g., using vehicle touchscreens or keyboards, or via user devices 102).

Optionally, the vehicle may include a wireless interface (e.g., Wi-Fi, Bluetooth, etc.) that can enable the interior interface system 125 to receive sensor data from passenger and/or rider devices 102 (e.g., mobile phone, smart watch, smart glasses, wireless earbuds, etc.), such as heart rate sensors, electrocardiogram (ECG) sensors, pulse oximeters, etc., and transmit such sensor data to the server 130 via the communication system 124 and the communications array 122. Based on user interactions with the interior interface system 125 and/or content presented thereby, the interior interface system 125 can receive content 167 via the network 110, the communications array 122, and/or the communication system 124.

The communication system 124 can dynamically manage network access to avoid or minimize disruption of the transmission of the content 167. The content 167, by way of example, can include route traffic data, information regarding the number of people currently present or expected to be present at the destination location (which may be of particular interest in times of pandemics and where the number of people may be determined from occupancy sensor data from sensors installed or present at the destination location, and/or may be determined from presence data transmitted by user devices 102 at the destination location), the operation hours of an establishment at the destination location, a token (e.g., a discount coupon, a ride credit for obtaining a free or discounted ride, a coupon to obtain a free good or service, an entry token that entitles the bearer to entry or prioritized entry, for establishments within a specified geofence of the destination location, where the token may optionally be assigned an expiration date, wherein the token is not valid for use after the expiration date), an apology (e.g., for a late arrival of the vehicle when picking up the rider, for a late arrival time at a destination location, for a bumpy ride, for a sudden braking event, for a cabin being at an uncomfortable temperature, etc.), and/or the like. The content may include text, still images, graphics, audible content, and/or video content.

A token provider (e.g., a store, restaurant, entertainment venue, advertiser) may upload a corresponding token file to the communication system 124 over a network. The token file may a token title, background, text, add page link, value data, and recipient codes. Optionally, some or all of the foregoing token file data may be manually entered via a token definition user interface. A given token file may include a unique code for each content recipient (e.g., each rider that will receive the token) so that each token provided to a recipient bears the corresponding unique code, or the token file may include a batch code, where every recipient receives the same token with the same code.

The sensor array 121 can include any number of one or more types of sensors, such as a satellite-radio navigation system (e.g., GPS), a LiDAR sensor, a landscape sensor (e.g., a radar sensor), an IMU, outward looking and cabin cameras (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, accelerometers (that provides multi-axis-based motion sensing), gyroscopes (that provide rotation data), tilt sensors, brake sensors, speed sensors, cabin temperature sensors, light intensity sensors, shock absorber compression sensors, magnetometers (that indicates which way is north by varying its voltage output), proximity sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers, such as those discussed above. The IMU provides data on the rotational and linear motion of the vehicle 120, which may be used to calculate the motion and position of the vehicle 120 and/or may be used to determine the ride quality.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like. Cameras may also be used to capture visual images of the vehicle cabin and/or users (e.g., to detect driver drowsiness based on images that indicate blink rate or head nodding, or to detect driver eye focus).

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123 (e.g., to normalize the sensor data, to compress the sensor data, to interpret the sensor data (e.g., process LiDAR data to determine object distances from the sensor or vehicle), etc.). The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161— which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, 5G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Figure 1C:
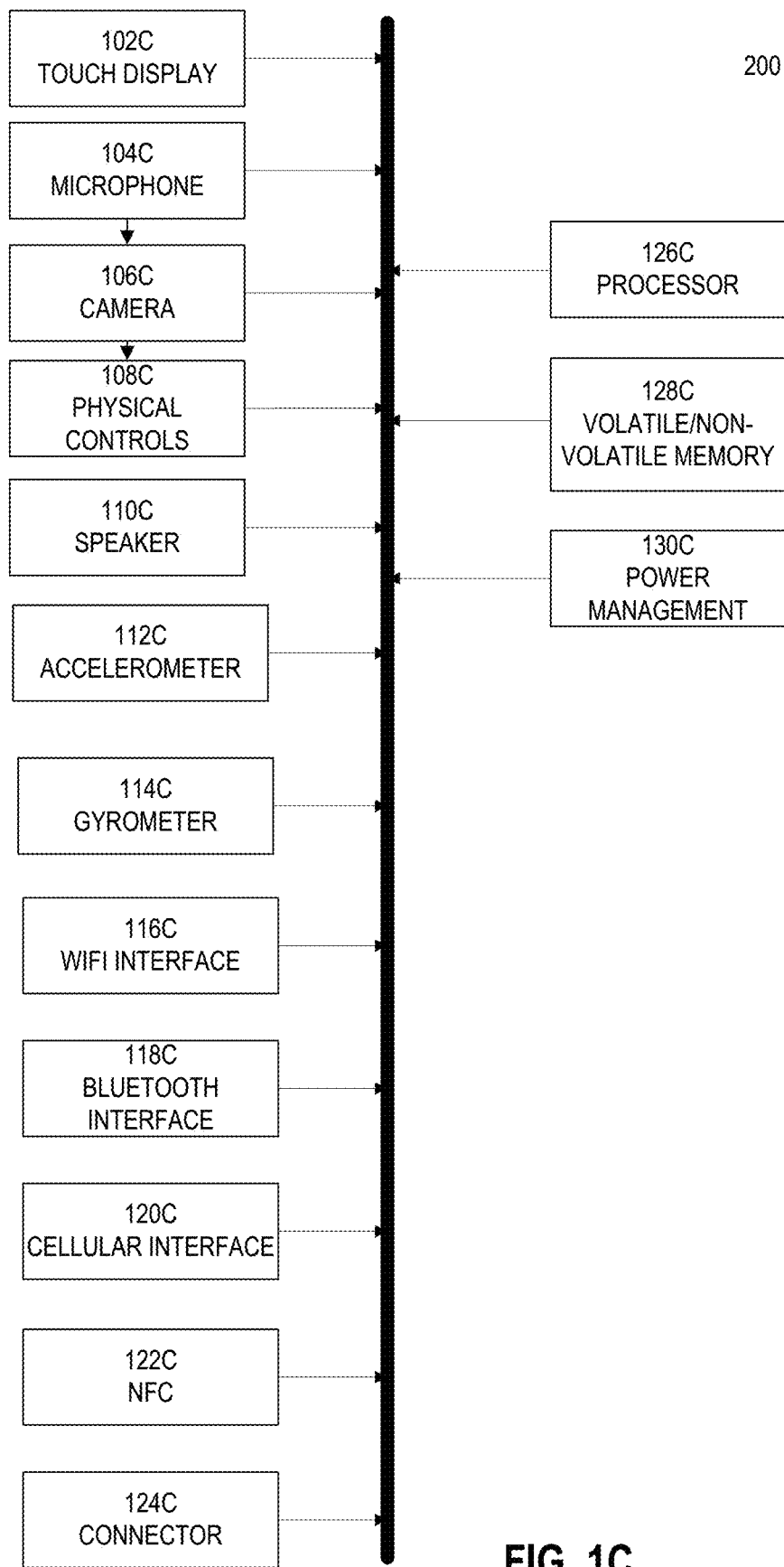
FIG. 1C illustrates a block diagram showing an example architecture of a user device.

FIG. 1C illustrates an example user device 102 in the form of a tablet, smart phone, laptop, smart watch, smart glasses, smart clothing, or appliance. In the example illustrated in FIG. 1C, the user device 102 includes various user input/output devices, such as a touch display 102C, a microphone 104C, camera 106C (which may include front facing and/or rear facing cameras), physical controls 108C (e.g., a power on/off control, a volume control, a home control, etc.), a speaker 110C, and/or other user input/output devices. The user device 102 may optionally include an accelerometer 112C that measures acceleration in 1-3 directions, a gyrometer (e.g., a 3-axis gyroscope) 114 that measures orientation in three axis, and/or other sensors. The user device 102 may also include light intensity sensors, proximity sensors, magnetometers, and/or temperature sensors. The user device 102 may be equipped with an external or integral physical keyboard, trackpad, joystick, electronic pen, and/or other input device.

The user device 102 may include one or more wireless and/or wired interfaces. For example, the user device 102 may include a WiFi interface 116C, a Bluetooth interface 118C, a cellular interface 120C, an NFC (near field communication) interface 122C, and/or one or more physical connectors 124C (e.g., a USB connector, a LIGHTING connector, and/or other connector). The user device 102C further comprises a processor device (e.g., a microprocessor) 130C, volatile memory (e.g., RAM solid state memory) and non-volatile memory (e.g., FLASH memory) 128C, and a power management device 134C. The user device 102 may communicate with the server 130 via the cellular interface 120C. Optionally, the user device 102C may communicate with the server 130 using the vehicle communication system 124 (where the user device 102 may utilize one of its wireless interfaces, such as WiFi interface 116C or Bluetooth interface 118C to communicate with the vehicle communication system 124 and to use the vehicle communication system 124 as a relay).

An application (e.g., a ride sharing application) installed on the user device 102 (e.g., stored in the non-volatile memory 128C and executed by the processor device 130C) may be utilized to provide certain functionality described herein. As discussed elsewhere herein, different functionality may be provided for different user types (e.g., riders, drivers). The application may be used to transmit user device sensor data (e.g., accelerometer data, gyroscope data, etc.) to the server 130 and to receive and display content from the server 130. As described herein, the server 130 may optionally analyze the sensor data and select content to be presented via the application on the user device 102.

Dynamic Generation and Display of Route-Related Content and Enabling Routing of Vehicles to High Demand Locations Systems and methods are described that use a generated route, pickup location data, destination location data, user information (e.g., of a rider or driver), sensor data, and/or log data to select content, and that determine whether content is to be presented to a user, and if so, select the content, and determine when the content is to be presented to the user (e.g., via a user device). For example, the selected content may be caused to be displayed on a user device at strategic points prior to starting a route, along the route, and/or after the route is completed.

In regard to the figures described herein, other embodiments are possible, such that the above-recited components, steps, blocks, operations, and/or messages/requests/queries/instructions are differently arranged, sequenced, sub-divided, organized, and/or combined. In some embodiments, a different component may initiate or execute a given operation.

For example, as will be described in great detail herein, certain information may be accessed regarding a user (which may be referred to a user data), such as a rider, from a data store and/or a mobile user device, and such information may be used to determine whether content is to be presented to the user via a user device, to select content to be presented, and/or to determine when to transmit and/or present such content (e.g., in real time in response to certain detected events or sensor data, or at a delayed time).

Such information may include relatively static data (although some of such "static" data may change from time to time), such as, with respect to a user that is a rider, the rider's home address, work address, demographic data (e.g., year of birth, gender identification, income, etc.), language, food and shopping preferences (e.g., based on the rider's history of using coupons, drop off locations, and manually provided preference data provided by the rider via a preference form), the rider's historical activities (e.g., origination and destination locations of past rides and the frequency thereof, interactions with route related content presented via a rider device, post-ride rider activities, use of tokens provided via a ride sharing application, and/or the like), and dynamic data (e.g., the rider's current location, a requested destination, date and time of day the ride is requested, traffic conditions on a current route, road conditions on a current route, temperature at a destination, population data at a destination location, density of establishments of different types at a destination location, etc.).

Content interaction may include a rider using content (e.g., a token) outside of the vehicle (e.g., to obtain a discount at a store or restaurant, to obtain a preferred service or other benefit, etc.). For example, if a rider uses a token with a code (e.g., a QR or other optical code encoding a unique identifier that may be displayed by a user device display) at an establishment, the code may be scanned at the establishment, and the ride sharing management and routing system may record the rider's use of the token in an account record associated with the rider. In addition, a message may be transmitted to the rider device indicating that the token has been used.

Once used/redeemed, the token may be visually, digitally marked so that when the rider views the token on the rider device, the rider may be presented with an indication (e.g., text, icon, or other indication) the token has been used and may no longer be used. Optionally, a token may be stored in a digital wallet on the user device and/or on a remote storage device, where the rider can access and view tokens stored in the digital wallet, and can present such tokens to be read or electronically scanned (e.g., by a bricks and mortar establishment). Optionally, used tokens may be automatically removed from the wallet by an application hosting the wallet after use.

Optionally, sensor data indicating a ride quality may also be accessed and used in selecting content. Such sensor data may be received from sensors in the rider's mobile device (e.g., a phone or wearable, such as a smart watch, smart glasses, and/or the like), in the driver's mobile device, and/or fixedly or removably installed in the vehicle (e.g., from the vehicle sensor array). As discussed elsewhere herein, the sensors may include accelerometers, tilt sensors, temperature sensors, speed sensors, wheel/braking sensors (which may be installed in brake pad, on a wheel rotor, on the wheel itself, or the like, and which may indicate wheel speed, brake pressure, brake disc temperature, brake operating time), and/or other sensors.

Such sensors may indicate sudden vehicle stops (e.g., from data from accelerometers indicating rapid deceleration (backward acceleration), tilt data from tilt sensors indicating vehicle dive, wheel brake sensor data indicating a high and sudden application of brake pressure, etc.), sudden acceleration (e.g., from data from accelerometers indicating rapid forward acceleration, or information from speed sensors indicating a rapid change of speed over time), bumpiness (e.g., from accelerometers indicating rapid up and down motions, from shock absorber sensors indicating that rapid compression or decompression of the shock absorbers, etc.), overly high or low vehicle cabin temperature (e.g., from temperature data from cabin temperature sensors and/or light intensity data from light intensity sensors), and/or the like.

Based on such static data, dynamic data, historical data, and/or sensor data, a determination may be made as to whether corresponding content should be presented to the rider via a rider device, and if so, corresponding content may be selected using some or all of the foregoing data and/or using criteria specified by the content provider, and the content may be transmitted over a secure wireless network for presentation on the rider's mobile device (e.g., via a ride sharing application or a browser accessing a ride sharing website).

Such content may be in the form of route traffic data, information regarding the number of people currently present or expected to be present at the destination location (which may be of particular interest in times of pandemics), the operation hours of an establishment at the destination location, a token (e.g., a discount coupon, a ride credit for obtaining a free or discounted ride, a coupon to obtain a free good or service, an entry token that entitles the bearer to entry or prioritized entry, for establishments within a specified geofence of the destination location), an apology (e.g., for a late arrival of the vehicle when picking up the rider, for a late arrival time at a destination location, for a bumpy ride, for a sudden braking event, for a cabin being at an uncomfortable temperature, etc.), and/or other content. More than one type of content may be transmitted and presented together. For example, a textual or graphic apology may be provided in conjunction with a token. Where the content includes a token, the token may be associated with an expiration date.

As discussed above, a token may be provided for use at establishments within a specified geofence of a destination location. The size and/or shape of the geofence may be static or may be dynamically generated based on one or more criteria. For example, the geofence square footage may be set based on the density of certain types of establishments (restaurants, clothing stores, etc.) present at the destination location, where, if the density is relatively high, the geofence may be configured to have a relatively smaller perimeter with less square footage (as there are more likely to be establishments of interest within a smaller geofence about the destination). Conversely, if the density of the certain types of establishments is relatively low, the geofence may be configured to have a relatively lager perimeter with less square footage, so as to encompass more of such types of establishments than if the smaller perimeter configured for higher density areas were used.

In addition or instead, the current or anticipated weather at the destination may be used in configuring the geofence, wherein the better the weather the larger the perimeter and square footage of the geofence are configured, and wherein the worse the weather, the smaller perimeter and square footage of the geofence are configured. For example, if the weather is adverse (e.g., cold, snowing, raining, hailing, hot, etc.), a rider may be less likely to walk a certain distance from the destination to an establishment at which the token can be used. Conversely, if the weather is pleasant (e.g., dry, 60-80 degrees Fahrenheit), a rider may be more likely to walk a certain distance from the destination to an establishment at which the token can be used.

In addition or instead, the rider's history in using tokens may be used in determining the perimeter and square footage of the geofence. For example, if historically, the rider has not used tokens more than a certain distance from the rider's destination, the geofence may be configured so that the distance from the rider's destination to corresponding establishments within the geofence is not greater than a threshold amount.

As will be discussed, optionally an artificial intelligence engine (e.g., a learning engine, such as a neural network) may be trained to predict how far and/or in what direction a rider is will to walk from a drop off point to an established at which a token may be used. A geofence may then be defined using the prediction. Establishments within the geofence may be identified. Using the identification of establishments within the geofence, available tokens for which the rider is available and which may be used at the identified establishments within the geofence may be selected and transmitted to a rider device.

Optionally, the timing of the presentation of the selected content may be dynamically determined using the foregoing static data, historical data, dynamic data, log data, pick-up location data, destination location data, sensor data, and/or content provider criteria. For example, a token may be provided within a certain distance or time before arrival at the destination. By way of further example, an apology and/or a token may be provided substantially immediately (e.g., within a range of 1 second to 2 minutes) after sensor data indicated a specified adverse ride condition. By way of yet still further example, a token may be provided in response to the rider opening the ride sharing application, in response to the rider requesting a ride to a specified location, in response to the vehicle arriving to pick up the rider, in real time during the ride, and/or in response to the ride ending (e.g., as determined by a ride ending indication provided by the driver or by the rider, and/or by comparing the vehicle's location and/or rider's location (e.g., determined by GPS or other location data from a vehicle device, driver device, or rider device)).

Optionally, the various types of data used in determining whether content is to be presented to the rider, in selecting content to be presented to the rider, and/or in determining when such selected content is to be presented to the rider may be differently weighted. Further, such weights may be different for different riders. The weights may be used to reflect that relative importance of a given data type in accurately and reliably determining how a rider will respond to content, whether content is to be presented to the rider, in selecting content to be presented to the rider, and/or in determining when such selected content is to be presented to the rider.

In addition to the data discussed above, other factors may be taken into account in determining whether content is to be presented to the rider, in selecting content to be presented to the rider, and/or in determining when such selected content is to be presented to the rider. For example, one or more entities may provide tokens (e.g., payment) to the system operator in order to have content presented to a rider matching certain demographics, having certain language settings, having favorite addresses in certain areas, having a home address in certain areas, having a work address in certain areas, having certain favorite addresses, being picked up at certain locations, traversing certain routes, being dropped off at certain locations, are on rides of certain lengths, are on rides whose route has a certain level of traffic, and/or the like.

Optionally, a rider may be able to opt out or opt in to having some or all of the foregoing data being used in determining whether content should be presented to the rider, in selecting content for presentation to the rider, and/or in determining when to present content to the rider. Such opt-in and/or opt-out data may be stored by the communication system and used accordingly in limiting how rider data is to be used. Thus, a rider may be enabled to protect and control the dissemination of rider-related information, thereby enhancing rider privacy.

As noted above, in addition to or instead of providing content to a rider, route-related content may be provided for display to a driver of a ride sharing vehicle. Given the large amount of information regarding drivers, a ride sharing management and routing system may identify and select particularly relevant content for a given driver. Such content may be optimized to enhance the likelihood that the driver will provide ride sharing services to high demand (e.g. where the demand exceeds or is predicted to exceed a corresponding threshold) and/or underserved locations, even when such locations are inconvenient to the driver and/or at times when the driver generally does not provide ride sharing services. Such content may be provided via a ride sharing application, which may be the same ride sharing application as used by riders, but with driver-oriented interfaces and functionality that may not be accessed by riders, or drivers may be provided with a different application which is oriented to ride sharing drivers.

For example, certain information may be accessed regarding a driver from a data store, a mobile driver device, and/or a driver vehicle. Such information may include relatively static data (although some of such data may change from time to time), such as the driver's home address, address(es) of other places of the driver's employment, the type of vehicle the driver is driving (e.g., a compact car, a midsize car, a large car, a minivan, a small SUV, a medium size SUV, a large SUV, vehicle make, vehicle model, vehicle model year), demographic data (e.g., year of birth, gender identification, income, marriage/partner status, year of birth of spouse/partner, gender identification of spouse/partner, number of children, year of birth of children, gender identification of children, etc.), language settings, the driver's ratings by riders, the driver's historical activities (e.g., origination and destination locations of past rides, beginning and end times of providing ride sharing services for each day over a selected period of time, locations of stops more than a threshold length of time when not transporting a rider (which may indicate a stop to use a restroom or a meal), weather conditions when the driver provided and/or did not provide ride sharing services, traffic conditions on routes previously driven by driver, interactions with route related content presented via a driver device, post-ride driver activities), and dynamic data (e.g., the driver's current location, a location of a rider requesting a ride that the driver has accepted, a location of a destination requested by the rider, the current date and time, traffic conditions on a current route, road conditions on a current route, temperature, rain conditions along the route, etc.).

Other driver information that may be accessed from the driver's device or a driver account stored on a server, may include a driver shopping list or to do/errand list.

Optionally, sensor data indicating a ride quality may also be accessed and used in selecting content for presentation on a driver device. As similarly discussed above, such sensor data may be in the driver's mobile device (e.g., a phone or wearable, such as a smart watch, smart glasses, smart clothing, and/or the like), and/or installed in the vehicle. The sensors may include accelerometers, tilt sensors, temperature sensors, speed sensors, wheel/braking sensors (which may be installed in brake pad, on a wheel rotor, on the wheel itself, or the like, and which may indicate wheel speed, brake pressure, brake disc temperature, brake operating time), and/or other sensors. Such sensors may indicate sudden vehicle stops (e.g., from data from accelerometers indicating rapid deceleration (backward acceleration). Tilt data from tilt sensors may be received indicating vehicle dive. Wheel brake sensor data may be received indicating a high and sudden application of brake pressure). Acceleration data may be received from which sudden acceleration may be determined (e.g., from data from accelerometers indicating rapid forward acceleration, or information from speed sensors indicating the change of speed over time). Ride bumpiness may be determined (e.g., from accelerometers indicating rapid up and down motions, from shock absorber sensors indicating that rapid compression or decompression of the shock absorbers). Overly high cabin temperature (e.g., above a certain temperature threshold) or low vehicle cabin temperature (e.g., below a certain temperature threshold) may be determined (e.g., from cabin temperature and/or light intensity sensors).

Other sensors (e.g., cameras, microphones, heart rate sensors, electrocardiogram (ECG), pulse oximeters, etc.) may measure or detect behavior, physiological states, and/or vehicle operations that indicate driver fatigue and/or drowsiness levels, and/or other driver impairment. For example, sensors may be utilized to measure:

Behavioral/physiological measurements (which may indicate a driver's alertness), including one or more of:

the frequency and duration of eye closed-state (which may be detected using a camera) which will increase and those of eye open state will decrease when drivers become fatigued;

head pose;

yawing (which may be detected using a microphone and/or camera);

pule rate (which may be measured using a pulse oximeter, such as one built into a watch), where a pulse rate of less than a threshold amount (e.g., 60 beats/minute) may indicate abnormally slow heart action, also known as bradycardia, which may be associated with fatigue.

Vehicle-based measurements, including one or more of:

frequency deviations from lane position (which may be detected using vehicle cameras), where a frequency above a certain threshold may indicate fatigue, drowsiness, or other impairment;

erratic movement of the steering wheel where a frequency above a certain threshold may indicate fatigue, drowsiness, or other impairment;

erratic pressure or pressure over a certain threshold on the acceleration pedal, etc., a change that crosses a specified threshold may indicate fatigue, drowsiness, or other impairment.

In addition, the quantity of demands for rides by riders at various locations (e.g., as determined from ride requests received from rider devices) at various time periods, the distance of such locations (and/or time to drive to such locations given current traffic condition) from the driver's current position, from the driver's home, from rest stops frequented by the driver, from the location of another place of employment of the driver, and/or other such data may optionally be utilized in selecting content for presentation on a driver device display (e.g., in combination with some or all the other data disclosed herein).

Based on such static data, dynamic data, historical data, shopping lists, to do lists, sensor data, and/or ride requests, corresponding content may be selected and transmitted over a secure wireless network for presentation on the driver's mobile device (e.g., via a ride sharing application or a browser accessing a ride sharing website). Such content may be in the form of route traffic data, suggested rest stops, the operation hours of suggested rest stop, suggested locations/establishments to obtain objects on a shopping list, suggested locations/establishments to perform activities on a to do list, a token, which may optionally be associated with an expiration date (e.g., a discount coupon, a coupon to obtain a free good or service, an entry token that entitles the bearer to entry or prioritized entry (e.g., for establishments within a specified geofence of a destination location), a suggested rest stop, suggested locations/establishments to obtain objects on a shopping list, suggested locations/establishments to perform activities on a to do list, a discount for suggested location/establishment to purchase items for a family member, etc.), and/or an apology (e.g., for a rider cancellation, for a very slow route through heavy congestion, etc.).

Optionally, the timing of the presentation of the selected content to the rider may be dynamically determined using the foregoing static data, dynamic data, historical data, shopping lists, to do lists, sensor data, and/or ride requests. For example, a token may be provided within a certain distance or time before arrival at a rider destination, before arrival at a suggested rest stop, before arrival at suggested locations/establishments to obtain objects on a shopping list, before arrival at suggested locations/establishment to perform activities on a to do list, before arrival at a suggested establishment to purchase items for a family member, and/or the like.

By way of further example, an apology and/or a token may be provided substantially immediately in real time (e.g., within a range of 1 second to 2 minutes) after sensor data indicated a specified adverse ride condition or after a rider cancellation. By way of yet still further example, a token may be provided in response to the driver opening the ride sharing application, in response to the driver accepting a ride request, in response to the vehicle arriving to pick up the rider, and/or in response to the ride ending (e.g., as determined by a ride ending indication provided by the driver or by the driver, and/or by comparing the vehicle's location and/or driver's location (e.g., determined by GPS or other location data from a vehicle device or driver device)). Such content may be displayed via a vehicle display (e.g., a display integral/built in to the vehicle), a mobile phone, and/or a wearable (e.g., smart watch, smart glasses, smart clothing, and/or the like) of the driver.

In addition to the data discussed above, other factors may be taken into account in determining whether content is to be presented to the driver, in selecting content to be presented to the driver, and/or in determining when such selected content is to be presented to the driver. For example, one or more entities may provide tokens (e.g., payment) to the system operator in order to have content presented to a driver matching certain demographics, having certain language settings, having certain frequented establishments, driving certain routes, driving a certain number of hours a day, other driver/user data discussed herein, and/or the like.

Optionally, a driver may be able to opt out or opt in to having some or all of the foregoing data being used in determining whether content should be presented to the driver, in selecting content for presentation to the driver, and/or in determining when to present content to the driver. Such opt-in and/or opt-out data may be stored by the communication system and used accordingly in limiting how driver data is to be used. Thus, a driver may be enabled to protect and control the dissemination of driver-related information, thereby enhancing driver privacy.

The utilization of an artificial intelligence engine will now be discussed with respect to selecting content and related issues for a user (e.g., a rider or driver). User data, sensor data, and/or log data may be received or accessed from the data store. An artificial intelligence engine (e.g., comprising a prediction heuristic) may be trained. As noted above, the artificial intelligence engine may comprise one or more computational, predictive models such as neural networks, decision trees, support vector machines, and/or other computational models. By way of further example, Bayes classifiers, hidden Markov models, dynamic Bayesian networks, and/or incremental classifiers may be used in making predictions.

Large amounts of existing user and sensor data may be input to and used to train the artificial intelligence engine in order to determine the weights, coefficients, connections, and/or parameters to enable the artificial intelligence engine to make sufficiently accurate predictions. The training may be performed in a supervised manner, where the engine is trained on labeled training examples having a known output. Optionally, instead, the artificial intelligence engine may be trained using unsupervised training, where the training examples are unlabeled and do not have known outputs.

A neural network may be trained for a specific user, where, optionally, during training the predictions are compared to only real-world actions of that user. Optionally, a neural network may be trained for a set of users (e.g., riders in a specific geographic area and/or having specific demographics (e.g., age, gender, income, family status, etc.), in common).

For example, where a neural network is used (e.g., a convolutional neural network), the neural network may include an input layer, one or more hidden layers comprising neurons connected by weights, the weights corresponding to the strength of the connection between neurons, and an output layer. Each time a neural layer is trained on an input, the difference between the predicted and true output causes an update in the weights using a backpropagation process.

For example, the neural network may be used to predict how far a certain user is willing to walk from a ride sharing drop-off destination location in order to use a token provided in association with a ride sharing application or event. The prediction made by the neural network may be compared to how far the certain user has actually walked from a ride sharing drop-off destination. If the neural network incorrectly predicted how far the user would walk (where the user has not walked a distance as far as the predicted distance to use a token), an error function may be used to generate weight updates so that the error is minimized. Optionally, a separate set of weights may be determined for each user, and those weights may be used to generate predictions for that user.

The neural network may be periodically retrained using new user, sensor, and/or log data.

Such predictions may be made for walking vectors (which include a distance component and a direction component) as opposed to simply distance. Such predictions may be used to generate a geofence which may be simply circular in nature, with a radius based on such predictions, or the generated geofence may be a polygon where the sides of the polygon are not necessarily equidistant from the ride sharing drop-off destination location.

Figure 2:
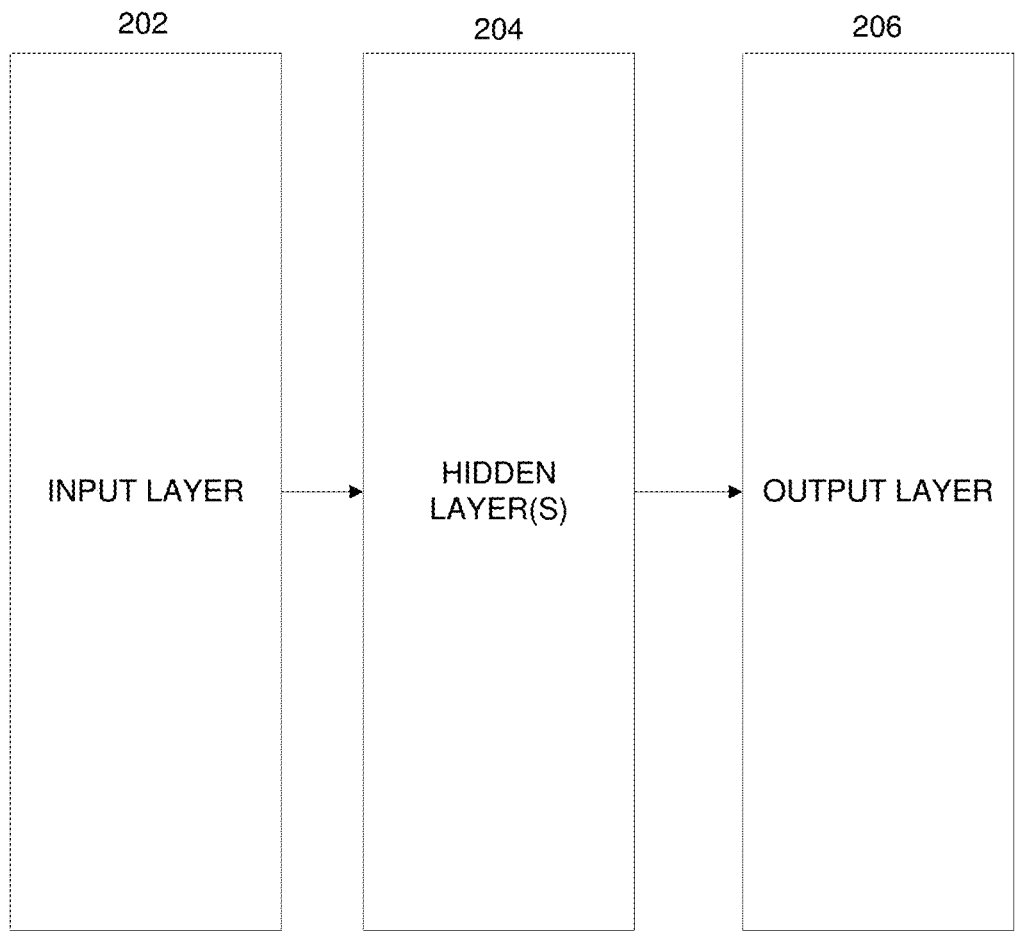
FIG. 2 illustrates an example architecture of a neural network configured to perform predictions.

Referring now to FIG. 2, an example neural network is illustrated which may be used to predict distances or vectors a user is likely to be willing to walk to utilize certain types of content (e.g., a token, such as a coupon), as described above. The distance may be different for different locations. For example, if the destination is an airport, the distance may be only 100-500 feet (e.g., from a rider's gate or terminal). By way of further example, if the destination is the downtown of a city, the distance may be 250 feet-1500 feet. The neural network may be trained using known historical user data for different types of locations (e.g., airports, downtown locations, shopping malls, beaches, parks, high density locations, low density locations, low income locations, high income locations, low crime areas, high crime areas, flat areas, hilly areas, areas with sidewalks, areas without sidewalks, etc.), for different weather conditions, for different times of day (e.g., daylight hours, nighttime hours, etc.), and/or for different token values. By way of illustration, the neural network may predict that a user may be willing to walk a relatively longer distance when the weather is relatively temperate and dry, and when the token value is relatively high.

The neural network may include an input layer 202, one or more hidden layers 204, and an output layer 206. Optionally, the neural network may include (e.g., as the first hidden layer) a Keras Embedding Layer (which turns positive integers (indexes) into dense vectors of fixed size). The neural network may be configured as a feed forward network. The neural network may be configured with a shared-weights architecture and with translation invariance characteristics. One or more hidden layers may be configured as convolutional layers (comprising neurons/nodes connected by weights, the weights corresponding to the strength of the connection between neurons), pooling layers, fully connected layers and/or normalization layers. The neural network may be configured with pooling layers that combine outputs of neuron clusters at one layer into a single neuron in the next layer. Max pooling and/or average pooling may be utilized. Max pooling may utilize the maximum value from each of a cluster of neurons at the prior layer. Back propagation may be utilized, and the corresponding neural network weights may be adjusted to minimize or reduce the error. Optionally, the loss function may comprise the Binary Cross Entropy loss function.

Optionally, the neural network may be configured as Long short-term memory (LSTM) neural network, which is a form of an artificial recurrent neural network (RNN) architecture having feedback connections, that may be particularly advantageous in deep learning applications, such as in predicting human behavior. A given LSTM unit may include a cell and regulators used to regulate the flow of information inside the LSTM unit. For example, the regulators may include an input gate, an output gate and a forget gate. The cell may be used to keep track of the dependencies between the elements in the input sequence. Because the cell comprises a memory unit, the cell can process data sequentially and retain its hidden state through time.

As discussed above, the neural network may be trained in a supervised manner on a set of training data in order to determine network weights so as to reduce the error/loss function. For example, the connections between the LSTM gates may be assigned weights determined during training, which determine the operation of the LSTM gates.

Figure 3A:
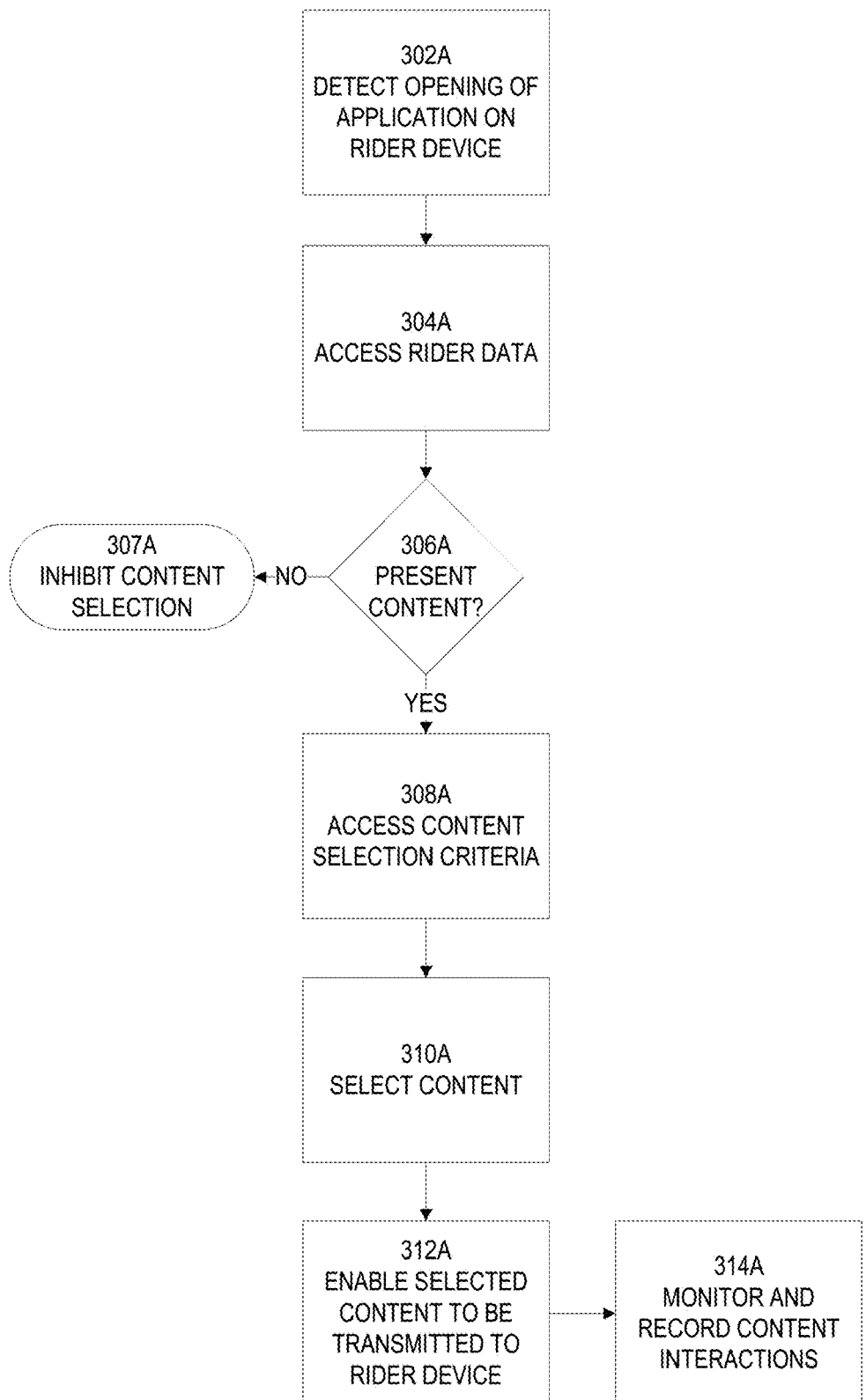
FIGS. 3A-4B illustrate example processes.
Figure 3B:
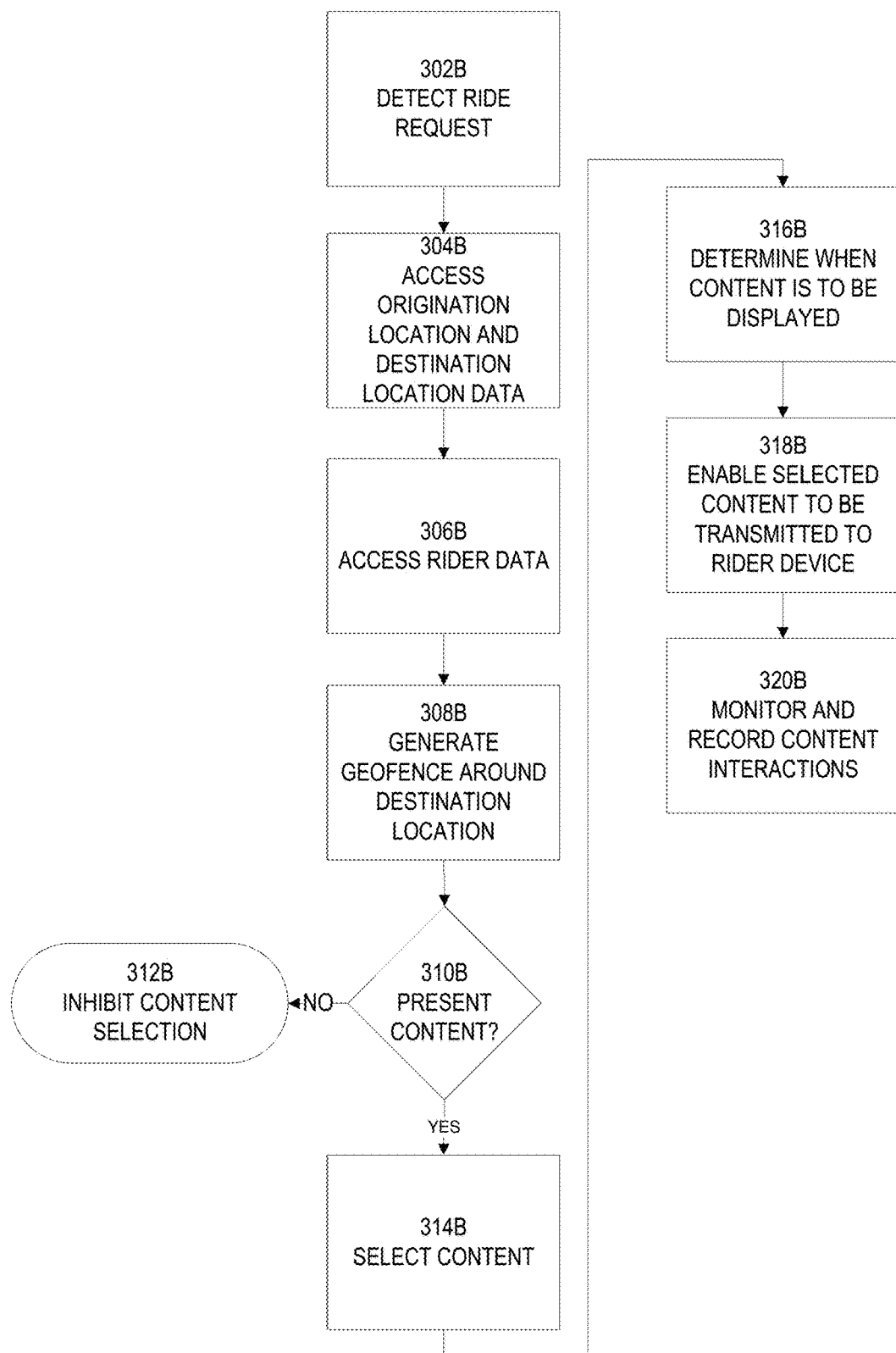
Figure 3C:
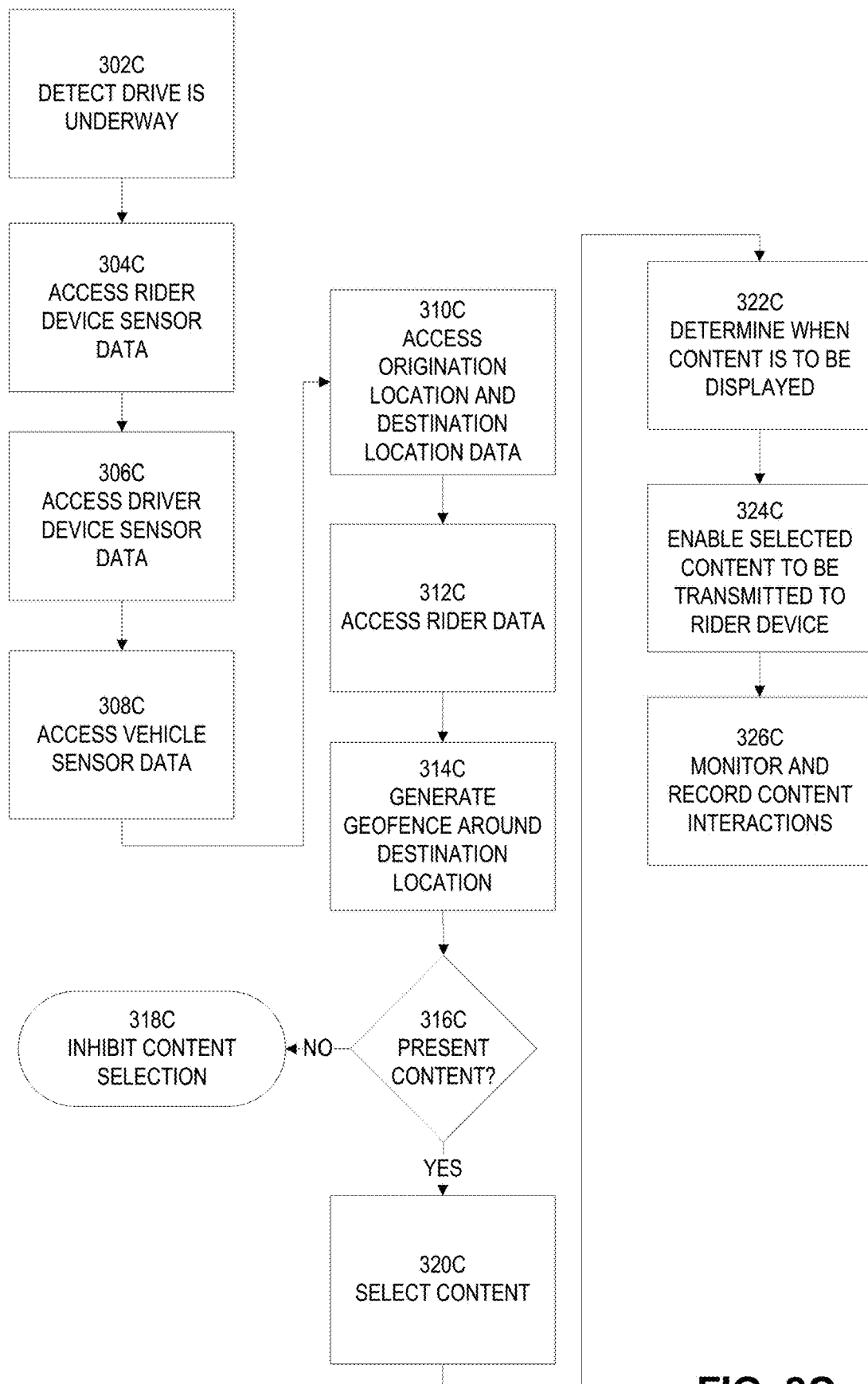

Referring to FIGS. 3A-3C, an example dynamic content selection and presentation process is illustrated for a user. In this example, the user is a rider. Referring to FIG. 3A, a process is illustrated for selecting and presenting content to a rider upon the rider opening an application (e.g., a rider sharing application).

At block 302A, the process detects whether the rider has opened an application (e.g., a ride sharing application) instantiated on a rider device (e.g., a smart phone, a smart wearable, a laptop, and/or the like) or logs into a ride sharing website. For example, when the application is opened it may transmit a message to a remote system (the server 130) which receives the message. The message may include an identifier associated with the rider. For example, the app may be associated with a unique instantiation code that is stored in a rider account stored on the remote system, or a user identifier and passcode defined by the rider may be transmitted to the remote system.

At block 304A, rider data may be accessed from a rider account identified using the identifier associated with the rider and/or from the rider device. For example, the rider data may include some or all of the information discussed elsewhere herein. By way of illustration, the rider data may include some or all of the following: the rider's home address, the rider's work address, the rider's favorite addresses, frequently visited addresses, the rider's demographic data (e.g., year of birth, gender identification, income, etc.), the rider's language settings, the rider's food and shopping preferences (e.g., based on the rider's history of using coupons, drop off locations, and manually provided preference data provided by the rider via a preference form), the rider's historical activities (e.g., origination and destination locations of past rides, interactions with content presented via the rider device, post-ride rider activities, the number of past rides, the frequency of past rides, etc.), and/or the rider's current location (e.g., as determined from location data received from the rider device).

At block 306A, a determination is made as to whether content is to be presented to the rider via the rider device in real time, at the current time. For example, the rider data may be analyzed and optionally assigned respective weights in determining whether content is to be presented to the rider at the current time. By way of illustration, if the rider has been presented with certain content in the past (e.g., tokens) upon opening the app and prior to requesting a ride, but has never interacted with such content in a desired manner (e.g., has never used/redeemed a token presented to the rider upon opening the app and prior to requesting a ride), or has interacted with such content at less than a threshold frequency (e.g., less than 25% of the time, less than 10% of the time, or some other threshold), a decision may be made not to present content at the current time. By way of illustration, if a determination is made that the rider is at work, and the rider has historically not requested a ride at the current time when at work, a decision may be made not to present content at the current time. The process may then proceed to bock 307A, and content selection may be inhibited for presentation at the current time.

If a determination is made at block 306A that content is to be displayed to the rider upon opening the app and prior to requesting a ride, the process may proceed to block 308A. At block 308A, content selection criteria may be accessed from memory.

For example, the content selection criteria may include some or all of the accessed rider data, content that content requesters requested to be provided to riders have certain demographics characteristics and certain historical patterns of behavior (e.g., types of interactions with types of content (e.g., tokens of different types/value), historical travel routes, and/or the like), the rider's current destination (e.g., airport, mall, sports arena, movie theater, etc.), the amount of traffic along the current route of the rider (e.g., heavy, medium, light), the length of the ride, the date, the time of day, and/or the like. By way of illustration, the frequency or aggregate number of rides by a rider may be used to determine the value of a token to be offered to the rider (e.g., where more frequent riders or otherwise preferred riders may be provided with relatively more valuable tokens than riders that travel less frequently). Where there are more than one content selection criterion, different weights may be accessed from memory and associated respective content selection criteria. Advantageously, optionally, the rider does not need to collect loyalty points from previous rides in order to receive a token.

At block 310A, the content selection criteria may be used to select content (optionally in real time) from one or more data sources. At block 312A, the selected content is transmitted to the rider device. Optionally, the selected content may be transmitted directly from the remote system, or the content may be routed by a different system (e.g., an ad server or content delivery network) to the rider device using information provided by the remote system.

At block 314A, the selected content that was transmitted to the rider device may be presented by the app hosted on the rider device to the rider, optionally in real time. For example, the content may be presented via a pop-up screen, an xpanel, a push notification alert, a link to a token transmitted to a messaging service or email address of the user, and/or the like.

Rider interactions with the content may be monitored, and interaction data may be stored in the rider account and/or may be transmitted to one or more destinations (e.g., a content source). For example, if the content includes a token (which may be redeemed if the driver accepts a ride request), and the rider activated a control to save the token in an electronic token wallet, a corresponding record may be stored. By way of further example, if the rider redeemed/used a token at an establishment (e.g., to obtain a reduced amount for an item or to obtain a free item), a corresponding record may be stored. Such recorded interactions may be tracked and used in the future in determining what tokens to offer the rider (or other riders) and/or when to offer the rider (or other riders) tokens.

Optionally, the clicking on and utilization of tokens may be tracked in the aggregate for all or a set of riders. Such data may be reported to one or more entities (e.g., a content provider, such as an advertiser), and may be used to determine advertising return on investment, in-app channel performance (e.g., cost of acquisition, repeat usage, engagement rates, brand awareness), conversion rates (e.g., how many riders used the token), and/or acceptance rates.

Referring to FIG. 3B, a process is illustrated for selecting and presenting content to a rider upon the rider requesting a ride (e.g., via a rider sharing application or via a browser). At block 302B a ride request from the rider is detected. For example, the rider may open a ride sharing application and provide (e.g., via user interface fields, via commands, or otherwise) a rider/transportation request.

When a rider requests transportation (e.g., via the application running on the rider device 102), the rider may specify a specific destination location. The origination/pickup location may be the current location of the rider device, which may be determined using the satellite-radio navigation system installed in the vehicle (e.g., GPS, Galileo, BeiDou/COMPASS, DORIS, GLONASS, and/or other satellite-radio navigation system), using a Wi-Fi positioning system, using cell tower triangulation, and/or the like, indicating that the rider is present in the vehicle and that the rider's route is being driven. Optionally, the origination location (e.g., a location address) may be specified by the rider via a rider interface provided by the rider device running the application. Optionally, the origination location may be automatically determined from location information obtained from the rider device. In addition to the origination location and destination location, one or more waypoints may be specified, enabling multiple destination locations.

Optionally, the rider may specify whether the rider wants to request an autonomous vehicle for transportation or whether the rider wants to request a human driver to navigate the vehicle.

At block 304B, the remote system may access origination/pickup location data and destination location data. For example, the origination location data and destination location data may include demographic data of residents at the respective locations (e.g., number of inhabitants, inhabitant density, income levels, education levels, average age, etc.), types of establishments, such as businesses, and density of establishments at respective locations (e.g., restaurants, clothing stores, grocery stores, electronics stores, etc.), current and/or predicted weather at respective locations, availability of tokens that may be distributed for use at respective locations, and/or the like.

Optionally, in parallel or serially, a matching service may be utilized that pairs the rider requesting a trip from the origination location to the requested destination location with a driver (or autonomous vehicle) that can pick up the rider and take the rider to the requested destination.

At block 306B, rider data may be accessed. As similarly discussed above, the rider data may be accessed from a rider account identified using the identifier associated with the rider and/or from the rider device. For example, the rider data may include some or all of the information discussed elsewhere herein. By way of illustration, the rider data may include some or all of the following: the rider's home address, the rider's work address, the rider's demographic data (e.g., year of birth, gender identification, income, etc.), the rider's language preference, the rider's favorite locations, the rider's frequently visited locations, the rider's selected point of interest, the rider's food and shopping preferences (e.g., based on the rider's history of using coupons, drop off locations, and manually provided preference data provided by the rider via a preference form), the rider's historical activities (e.g., origination and destination locations of past rides, interactions with content presented via the rider device, post-ride rider activities, etc.), and/or the rider's current location (e.g., as determined from location data received from the rider device).

At block 308B, a geofence may be generated about the destination location. The geofence may reflect rider characteristics, destination location characteristics, availability of tokens, and/or the value of available tokens. As similarly discussed elsewhere, an artificial intelligence engine (e.g., a learning engine, such as a neural network), may be trained to predict how far and/or the direction the rider is likely to be willing to walk from the destination to utilize a token based on historical rider data (e.g., where the prediction may be related to the rider's walking history at similar locations or at the same location under the same and/or different weather conditions, for tokens of different values, etc.). Once the predicted distance and/or direction is generated, a corresponding geofence may be generated. The geofence may be or may not be symmetrical about the location. For example, one or more geofence may be utilized to restrict the geofence from traversing certain environment features (e.g., rivers, highways, high crime areas, etc.). The geofence may have a circular or truncated circular shape, an elliptical or truncated circular shape, a polygon shape, or a combination thereof.

At block 310B, using the geofence and rider data, a determination may be made as to whether content is to be presented to the rider at this time (after a request for transportation was made/received and before the vehicle has picked up the rider or before the ride has begun). For example, the rider data may be analyzed and optionally assigned respective weights in determining whether content is to be presented to the rider at the current time. By way of illustration, if the rider has been presented with certain content in the past (e.g., tokens) after a request for transportation was made/received and before the vehicle has picked up the rider or before the ride has begun, but has never interacted with such content in a desired manner (e.g., has never used/redeemed a token presented to the rider upon opening the app and prior to requesting a ride), or has interacted with such content at less than a threshold frequency (e.g., less than 25% of the time, less than 10% of the time, or some other threshold), a decision may be made not to present content at the current time. The process may then proceed to bock 312B, and content selection may be inhibited for presentation at the current time.

If a determination is made at block 310B that content is to be displayed, content may be selected at block 314B. For example, if the content comprises one or more tokens, the tokens may be selected based on the size and placement of the geofence, historical rider behavioral data, rider preferences, the availability of different types of tokens that may be utilized at establishments within the geofence, distance from destination, time from destination, weather, current day and time, approximate amount of time until next meal time (e.g., 8 AM for breakfast, 12 PM for lunch, 6 PM for dinner, etc.) and/or other data. Where there is more than one content selection criterion, different weights may be accessed from memory and associated respective content selection criteria.

At block 316B, a determination may be made as to when the content is to be displayed to the rider. For example, the content may be caused to be presented to the rider substantially immediately in real time, after it is detected that the rider has been picked up by the vehicle (e.g., as determined using rider device, driver device, and/or vehicle sensor data, and/or based on a manual indication provided by the driver and/or rider via the rider device, driver device, and/or vehicle interior interface system), at a specified point on the route (e.g., a specified time or distance from the origination location or the destination location), and/or after disembarking from the vehicle. The determination as to when the content is to be presented may be based on historical content interaction data for the rider specifically and/or based on historical content interaction data for a set of riders that have certain similar characteristics as the rider (e.g., having one or more common demographic characteristics). The timing of the content presentation may be determined using an artificial intelligence engine (e.g., a neural network) so as to increase or maximize the likelihood that the rider will interact with the content in a desired way (e.g., save the content, such as a token, in a digital wallet, use/redeem the content at a corresponding location, etc.).

At block 318B, the content is enabled to be transmitted to the rider device (and/or a vehicle display device). Optionally, the selected content may be transmitted directly from the remote system, or the content may be routed by a different system (e.g., an ad server) to the rider device using information provided by the remote system. Optionally, the content may be transmitted with timing instructions specifying when (based on time and/or location) the content is to be presented on the rider device. The app on the rider device may then cause the content to be presented in accordance with the timing instructions. Optionally instead, the content is not transmitted to the rider device until the content is to be presented, and the app on the rider device may then present the content once received substantially immediately, in real time.

At block 320B, rider interactions with the content may be monitored, and interaction data may be stored in the rider account and/or may be transmitted to one or more destinations (e.g., a content source). For example, if the content is a token, and the rider activated a control to save the token in an electronic token wallet, a corresponding interaction message may be transmitted to a remote system (e.g., the communication system, the content provider system, or other system), and a record may be stored. By way of further example, if the rider redeemed/used a token at an establishment (e.g., to obtain a reduced amount for an item or a free item), a corresponding interaction message may be transmitted to a remote system (e.g., the communication system, the content provider system, or other system), and record may be stored. Such recorded interactions may be used in the future in determining what tokens to offer the rider and/or when to offer the rider tokens, as well as to generate performance analytics with respect to the content.

A process of presenting content to a driver (as opposed to a rider) will now be further discussed.

Figure 4A:
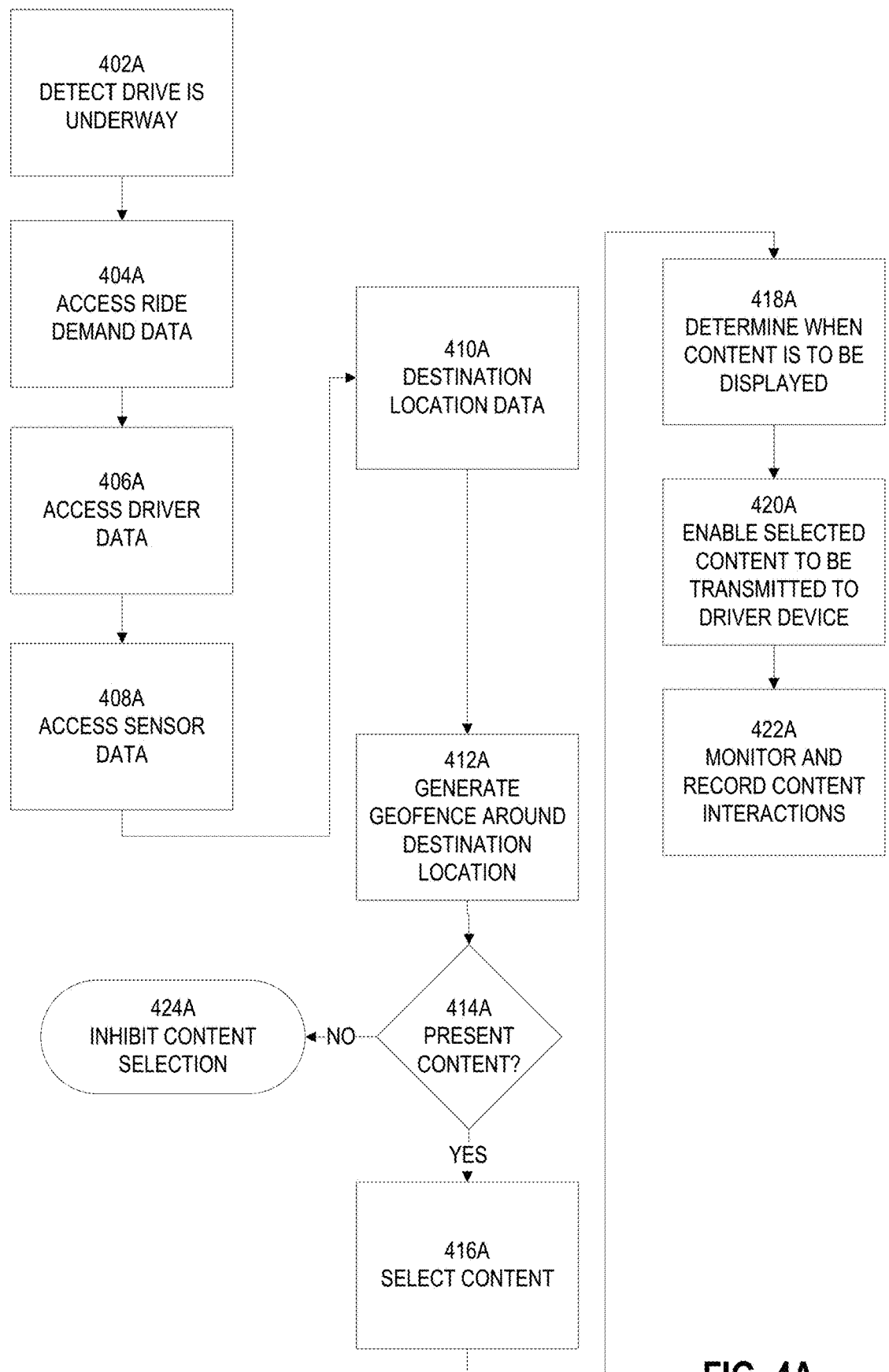

Referring to FIG. 4A, a process is illustrated for selecting and presenting content to a driver (e.g., via a rider sharing application) during a ride (e.g., during a stop at a waypoint, rest area, while waiting for a train to pass, while on a ferry or other location where it is safe for the driver to view content) or just after a ride (after the driver picked up a rider using a vehicle or after the route has been completed). The process may be executed in whole or in part using a system (e.g., server 130) remote from the driver and vehicle. Optionally, the process may be performed at least in part by the driver device.

At block 402A, the process detects that a ride, being driven by the driver to transport a rider, is underway. The detection may be performed automatically. For example, the process may detect that the vehicle arrived and departed from the rider's origination location (e.g., where the rider origination location may be determined from a manual rider address entry or from location information received from the rider's device). A determination may be made that the rider's ride is underway from location data from the rider's device, the driver's device, or using a satellite-radio navigation system installed in the vehicle (e.g., GPS, Galileo, BeiDou/COMPASS, DORIS, GLONASS, and/or other satellite-radio navigation system), using a Wi-Fi positioning system, using cell tower triangulation, and/or the like, indicating that the rider is present in the vehicle and that the rider's route is being driven. Optionally, the vehicle driver or rider may manually provide a ride in progress indication via an app (e.g., a ride sharing app).

At block 404A, current and/or anticipated ride requests within a threshold range (e.g., within 100 meters, within 500 meters, within 1 kilometer, within 2 kilometers, within 5 kilometers, within 10 kilometers, or other threshold range) of the destination of the current route (e.g., at the driver's estimated time of arrival) are accessed. Optionally, the determination may be limited to a specified time period (e.g., within a threshold time period after the driver is anticipated to arrive at the current route destination).

At block 406A, driver data is accessed from the driver's account record. As similarly discussed above, the driver data may be accessed from a driver account identified using the identifier associated with the driver, the driver device, and/or the driver vehicle. For example, the driver data may include some or all of the information discussed elsewhere herein. By way of illustration, the driver data may include some or all of the following: the driver's home address, the driver's alternate work address, the driver's demographic data (e.g., year of birth, gender identification, income, etc.), the driver's language setting, the driver's food and shopping preferences (e.g., based on the driver's history of using coupons, drop off locations, and manually provided preference data provided by the driver via a preference form), the driver's historical activities (e.g., frequented rest areas for bathroom use (e.g., the name, type (e.g., restaurant, gas station, convenience store, etc.), and geographical location of rest area), origination and destination locations of past routes driven by the driver, interactions with content presented via the driver device, post-ride driver activities, etc.), and/or the driver's current location (e.g., as determined from location data received from the driver device or vehicle).

At block 408A, sensor data may be read continuously or at specified periods/intervals from the driver device and/or vehicle. The period at which the sensor data is transmitted from the driver device to the remote system may be a default period specified in the rider sharing app hosted on the driver's device. The period may be dynamically determined by the remote system (e.g., based on the route, current network loading or ping times, remote system processor utilization, etc.), and the dynamically determined period may be transmitted to the rider sharing app installed on the driver device which may then transmit the sensor data accordingly. Optionally, different periods may be specified for different driver device sensor data (e.g., based on how rapidly the sensor data is expected to change or how significant the sensor data is to determining certain ride-related conditions).

The sensors may include some or all of the driver device sensors providing corresponding sensor data discussed herein (e.g., accelerometer data indicating acceleration in 1 to 4 directions, gyrometer data (e.g., providing device rotation information in 1 to 4 axis), ambient light intensity sensors indicating ambient light intensity, proximity data (which may indicate that the rider is holding the rider device), magnetometer data (indicating the direction of true north), temperature sensor data (indicating vehicle cabin temperature), camera data, and/or the like. As discussed herein, the driver device sensor data may indicate ride quality (e.g., hard accelerations, hard braking/decelerations, bumps, etc.).

Such sensors may indicate sudden vehicle stops (e.g., from data from accelerometers indicating rapid deceleration (backward acceleration), tilt data from tilt sensors indicating vehicle dive, wheel brake sensor data indicating a high and sudden application of brake pressure, etc.), sudden acceleration (e.g., from data from accelerometers indicating rapid forward acceleration, or information from speed sensors indicating a rapid change of speed over time), bumpiness (e.g., from accelerometers indicating rapid up and down motions, from shock absorber sensors indicating that rapid compression or decompression of the shock absorbers, etc.), overly high or low vehicle cabin temperature (e.g., from temperature data from cabin temperature sensors and/or light intensity data from light intensity sensors), and/or the like. Thus, the vehicle sensor data may be used to determine ride quality (e.g., ride bumpiness, sudden stops, neck-snapping acceleration, cabin temperatures above or below respective temperature thresholds, etc.).

At block 410A, destination location data for the current route may be accessed. Destination location data may include demographic data of residents at the destination location (e.g., number of inhabitants, inhabitant density, income levels, education levels, average age, etc.), types of establishments, such as businesses, and density of establishments at respective locations (e.g., restaurants, clothing stores, grocery stores, electronics stores, etc.), current and/or predicted weather at the destination location, availability of tokens that may be distributed for use at the destination location, and/or the like.

At block 412A, a geofence may be generated about the destination location. The geofence may reflect driver characteristics, destination location characteristics (which may include anticipated availability of parking spaces where the driver may park the vehicle), availability of tokens, and/or the value of available tokens. As similarly discussed elsewhere, an artificial intelligence engine (e.g., a learning engine, such as a neural network), may be trained to predict how far the driver is likely to be willing to walk from the destination or parking in the destination area to utilize a token based on historical driver data (e.g., where the prediction may be related to the driver's walking history at similar locations or at the same location under the same and/or different weather conditions, for tokens of different values, etc.). Once the predicted distance is generated, a corresponding geofence may be generated. The geofence may be or may not be symmetrical about the location. For example, one or more geofence may be utilized to restrict the geofence from traversing certain environment features (e.g., rivers, highways, high crime areas, etc.). The geofence may have a circular or truncated circular shape, an elliptical or truncated circular shape, a polygon shape, or a combination thereof.

At block 414A, using the geofence, driver data, and/or sensor data, a determination may be made as to whether content is to be presented to the driver during the route. For example, the driver data may be analyzed and optionally assigned respective weights in determining whether content is to be presented to the driver during the route. By way of illustration, if the driver has been presented with certain content in the past (e.g., tokens) during routes, but has never interacted with such content in a desired manner (e.g., has never used/redeemed a token presented to the driver after arriving at a route destination), or has interacted with such content at less than a threshold frequency (e.g., less than 25% of the time, less than 10% of the time, or some other threshold), a decision may be made not to present content during the route. The process may then proceed to bock 424A, and content selection may be inhibited for presentation at the current time.

If a determination is made at block 414A that content is to be displayed, content may be selected at block 416A. For example, if the content comprises one or more tokens, the tokens may be selected based on the size and placement of a geofence (e.g., within a geofence about the driver's home, at rest areas that the driver frequently stops at, at establishments corresponding to a shopping and/or to do list of the driver), historical driver behavioral data, driver preferences, the availability of different types of tokens that may be utilized at establishments within the geofence, distance from destination, time from destination, weather, current day and time, approximate amount of time until next meal time (e.g., 8 AM for breakfast, 12 PM for lunch, 6 PM for dinner, etc.), the driver's demographic data (e.g., number and age of children, marital/partner status, etc.), and/or other data. Where there is more than one content selection criterion, different weights may be accessed from memory and associated respective content selection criteria.

At block 418A, using the geofence, driver data, sensor data (e.g., rider device, driver device, and/or vehicle sensor data), and/or anticipated safe stop locations (where a determination may be made as to whether the vehicle is at a safe stop location using location data received from the vehicle or driver device and using vehicle sensor data to determine whether the vehicle is parked or stopped for an extended period of time), a determination may be made as to whether content is to be presented to the driver at current time and/or at a delayed time. For example, the driver data, rider device sensor data, driver device sensor data, and/or vehicle device sensor data may be analyzed and optionally assigned respective weights in determining whether content is to be presented to the driver at the current time or at a delayed time.

For example, the determination as to when the content is to be presented may be based on historical content interaction data for the driver specifically and/or based on historical content interaction data for a set of drivers that have certain similar characteristics as the driver (e.g., having one or more common demographic characteristics). The timing of the content presentation may be determined using an artificial intelligence engine (e.g., a neural network) so as to maximize the likelihood that the driver will interact with the content in a desired way (e.g., save the content, such as a token, in a digital wallet, use the content at a corresponding location, etc.).

By way of further illustration, if sensor data indicates that the ride is of low quality (e.g., as a result of a bumpy ride, a sudden stop, sudden acceleration, high cabin temperature, low cabin temperature), a determination may be made that a token is to be presented to the driver substantially immediately after detecting that the ride has fallen below a predetermined or dynamically determined ride quality threshold.

By way of yet further illustration, if the driver has been presented with certain content (e.g., tokens) on past routes, at different points in a corresponding route (e.g., just before the vehicle leaves the pickup location, at safe stop areas about in the middle (relative to the time length or distance length) of the route, at safe stop areas a certain period of time or distance before arriving at the route destination, or substantially immediately after a negative ride condition occurred), there may have been different driver interaction statistics corresponding to the different route points. Example interactions may be storage of a token in an electronic token wallet for use at an establishment or use of such a token at an establishment. For example, a driver's token interaction history may indicate that the driver is more likely to interact with content if presented immediately after negative ride condition was detected than if the content was presented more than 5 minutes later.

At block 420A, the content is enabled to be transmitted to the driver device or integrated vehicle display device. Optionally, the selected content may be transmitted directly from the remote system, or the content may be routed by a different system (e.g., an ad server) to the driver device using information provided by the remote system. Optionally, the content may be transmitted with timing instructions specifying when (based on time and/or location) the content is to be presented on the driver device. The app on the driver device (or vehicle display device) may then cause the content to be presented in accordance with the timing instructions. Optionally instead, the content is not transmitted to the driver or vehicle display device until the content is to be presented, and the app on the driver or vehicle device may then present the content once received substantially immediately.

At block 422A, driver interactions with the content may be monitored, and interaction data may be stored in the driver account and/or may be transmitted to one or more destinations (e.g., a content source). For example, if the content is a token, and the driver activated a control to save the token in an electronic token wallet, a corresponding record may be stored. By way of further example, if the driver redeemed/used a token at an establishment (e.g., to obtain a reduced amount for an item or a free item), a corresponding record may be stored. The monitored and recorded interactions may be transmitted to one or more destinations (e.g., a content source, the communication system, etc.). Such recorded interactions may be used in the future in determining what tokens to offer the driver and/or when to offer the driver tokens.

Figure 4B:
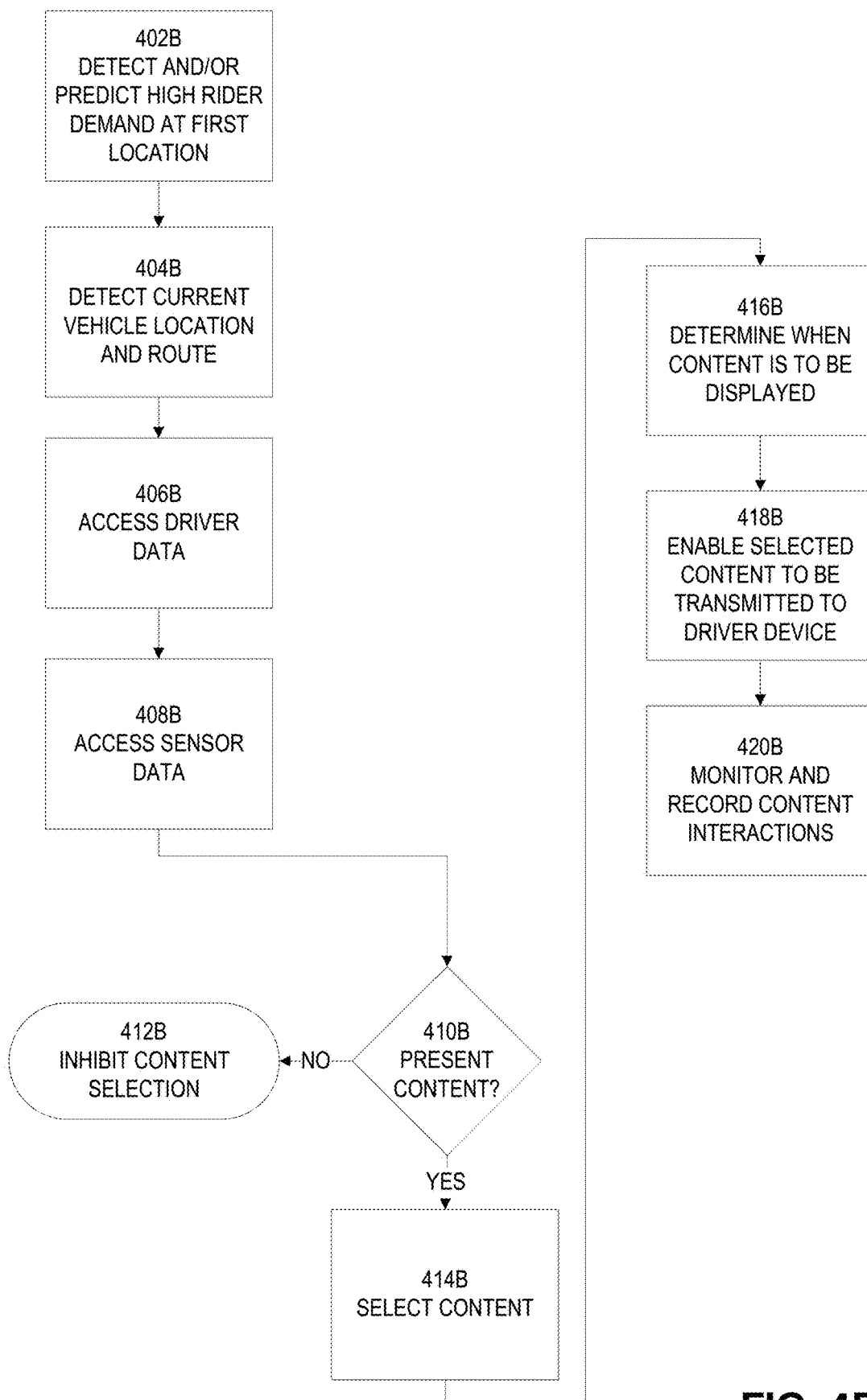

Referring to FIG. 4B, a process is illustrated for selecting and presenting content to a driver (e.g., via a rider sharing application) at least partly in response to detecting high ride demand at one or more locations.

At block 402B, high rider demand is detected and/or predicted at one or more locations for a given time period. The demand determination may be made based on ride requests received from user devices at a given location/address (e.g., a sports arena, a concert venue, a restaurant, etc.), and/or within a specific area (e.g., within a geofence, a zip code, a neighborhood, etc.), within a time period (e.g., the previous 1 minute, 5 minutes, 30 minutes). In addition or instead, the demand determination for a given location may be based on a prediction based on historical demand data for the location during the given time period and/or based on a scheduled event at the location for the given time period (e.g., a sporting event, a concert event, etc.).

At block 404B, the vehicle's current location and ride route (if any) is detected. For example, the vehicle current location may be determined from location data from the rider's device, the driver's device, or using a satellite-radio navigation system installed in the vehicle (e.g., GPS, Galileo, BeiDou/COMPASS, DORIS, GLONASS, and/or other satellite-radio navigation system), using a Wi-Fi positioning system, using cell tower triangulation, and/or the like. The route data may include pickup location data, destination data, and/or node traversal data. Of course, the driver may not be driving a route for a rider's route. By way of example, the driver may be driving home after completing what was intended to be a last ride sharing ride.

At block 406B, driver data is accessed from the driver's account record. As similarly discussed above, the driver data may be accessed from a driver account identified using the identifier associated with the driver, the driver device, and/or the driver vehicle. For example, the driver data may include some or all of the information discussed elsewhere herein. By way of illustration, the driver data may include some or all of the following: the driver's home address, the driver's alternate work address, the driver's demographic data (e.g., year of birth, gender identification, income, etc.), the driver's language setting, the driver's food and shopping preferences (e.g., based on the driver's history of using coupons, drop off locations, and manually provided preference data provided by the driver via a preference form), the driver's historical activities (e.g., frequented rest areas for bathroom use (e.g., the name, type (e.g., restaurant, gas station, convenience store, etc.), and geographical location of rest area), origination and destination locations of past routes driven by the driver, interactions with content presented via the driver device, post-ride driver activities, etc.), and/or the driver's current location (e.g., as determined from location data received from the driver device or vehicle).

At block 408B, sensor data may be read continuously or at specified periods/intervals from the driver device and/or vehicle. The period at which the sensor data is transmitted from the driver device to the remote system may be a default period specified in the rider sharing app hosted on the driver's device. The period may be dynamically determined by the remote system (e.g., based on the route, current network loading or ping times, remote system processor utilization, etc.), and the dynamically determined period may be transmitted to the rider sharing app installed on the driver device which may then transmit the sensor data accordingly. Optionally, different periods may be specified for different driver device sensor data (e.g., based on how rapidly the sensor data is expected to change or how significant the sensor data is to determining certain ride-related conditions).

The sensors may include some or all of the driver device sensors providing corresponding sensor data discussed herein (e.g., accelerometer data indicating acceleration in 1 to 4 directions, gyrometer data (e.g., providing device rotation information in 1 to 4 axis), ambient light intensity sensors indicating ambient light intensity, proximity data (which may indicate that the rider is holding the rider device), magnetometer data (indicating the direction of true north), temperature sensor data (indicating vehicle cabin temperature), camera data, and/or the like. As discussed herein, the driver device sensor data may indicate ride quality (e.g., hard accelerations, hard braking/decelerations, bumps, etc.).

Such sensors may indicate sudden vehicle stops (e.g., from data from accelerometers indicating rapid deceleration (backward acceleration), tilt data from tilt sensors indicating vehicle dive, wheel brake sensor data indicating a high and sudden application of brake pressure, etc.), sudden acceleration (e.g., from data from accelerometers indicating rapid forward acceleration, or information from speed sensors indicating a rapid change of speed over time), bumpiness (e.g., from accelerometers indicating rapid up and down motions, from shock absorber sensors indicating that rapid compression or decompression of the shock absorbers, etc.), overly high or low vehicle cabin temperature (e.g., from temperature data from cabin temperature sensors and/or light intensity data from light intensity sensors), and/or the like. Thus, the vehicle sensor data may be used to determine ride quality (e.g., ride bumpiness, sudden stops, neck-snapping acceleration, cabin temperatures above or below respective temperature thresholds, etc.).

At block 410B, a determination may be made as whether to present the driver with certain content based in the detected high rider demand, current vehicle location and route, driver data, and/or sensor data. By way of illustration, a determination may be made as whether to provide the driver with a token in exchange for the driver accepting a ride request at a high demand location (e.g. where the demand exceeds or is predicted to exceed a corresponding threshold) within a specified time period and/or in exchange for driving to the high demand location within a specified time period so as to be available to accept an anticipated/predicted ride request at the high demand location.

For example, as discussed elsewhere herein, the driver data may be analyzed and optionally assigned respective weights in determining whether content, such as a token, is to be presented to the driver during the route. By way of illustration, if the driver has been presented with certain content in the past (e.g., tokens) in exchange for the driver accepting a ride request at the specific high demand location within the specific specified time period and/or in exchange for driving to the specific high demand location within the specified time period so as to be available to accept an anticipated/predicted ride request at the high demand location, but has never interacted with such content in a desired manner (e.g., has never accepted the token in exchange for driving to the high demand location within a specified time period so as to be available to accept an anticipated/predicted ride request at the high demand location specified time period so as to be available to accept an anticipated/ predicted ride request at the high demand location),or has interacted with such content at less than a threshold frequency (e.g., less than 25% of the time, less than 10% of the time, or some other threshold), a decision may be made not to present the content.

Optionally by way of further illustration, in addition or instead, if the driver has been presented with certain content in the past (e.g., tokens) in exchange for the driver accepting ride requests at a plurality of different high demand locations within a plurality of different time periods and/or in exchange for driving to different high demand locations within different time periods so as to be available to accept an anticipated/predicted ride request, but has never interacted with such content in a desired manner (e.g., has never accepted the token in exchange for driving to the high demand location within a specified time period so as to be available to accept an anticipated/predicted ride request at the high demand location specified time period so as to be available to accept an anticipated/predicted ride request at the high demand location),or has interacted with such content at less than a threshold frequency (e.g., less than 25% of the time, less than 10% of the time, or some other threshold), a decision may be made not to present the content.

If a determination is made that such content is not be presented, the process may then proceed to bock 412B, and content selection may be inhibited for with respect to the higher rider demand.

If a determination is made at block 410B that content is to be displayed, content may be selected at block 4148. For example, if the content comprises one or more tokens, the tokens may be selected based on the rider's historical driver behavioral data, driver preferences, the driver's demographic data (e.g., number and age of children, marital/partner status, etc.), the availability of different types of tokens that may be utilized at establishments within a specific area or areas (e.g., within a geofence about the driver's home, at rest areas that the driver frequently stops at, at establishments corresponding to a shopping and/or to do list of the driver), sensor data indicating the quality of one or more rides, and/or the volume of detected ride demands at the high demand location (e.g., where the greater the demand the greater the value of the token selected). Where there is more than one content selection criterion, different weights may be accessed from memory and associated respective content selection criteria.

At block 416B, using the driver data, current location, sensor data, safe stop data (indicating that the driver is or will be stopped for a period of time and so it is safe to present the content to the driver) and/or the estimated rider's (or rider's vehicle) driving time and/or distance from the high demand location, a determination may be made as to when the selected content is to be presented to the driver. For example, the content may be presented immediately, when the driver is within a threshold driving time of the high demand location, or at the next safe stop location.

At block 418B, the content is enabled to be transmitted to the driver device or vehicle display device. Optionally, the selected content may be transmitted directly from the remote system, or the content may be routed by a different system (e.g., an ad server) to the driver device using information provided by the remote system. Optionally, the content may be transmitted with timing instructions specifying when (based on time and/or location) the content is to be presented on the driver device. The app on the driver device (or vehicle display device) may then cause the content to be presented in accordance with the timing instructions. Optionally instead, the content is not transmitted to the driver or vehicle display device until the content is to be presented, and the app on the driver or vehicle device may then present the content once received substantially immediately.

At block 420B, driver interactions with the content may be monitored, and interaction data may be stored in the driver account and/or may be transmitted to one or more destinations (e.g., a content source). For example, if the content is a token, and the driver activated a control to save the token in an electronic token wallet, a corresponding record may be stored. By way of further example, if the driver redeemed/used a token at an establishment (e.g., to obtain a reduced amount for an item or a free item), a corresponding record of such interaction may be stored. The monitored and recorded interactions may be transmitted to one or more destinations (e.g., a content source). Such recorded interactions may be used in the future in determining what tokens to offer the driver and/or when to offer the driver tokens.

Figure 5A:
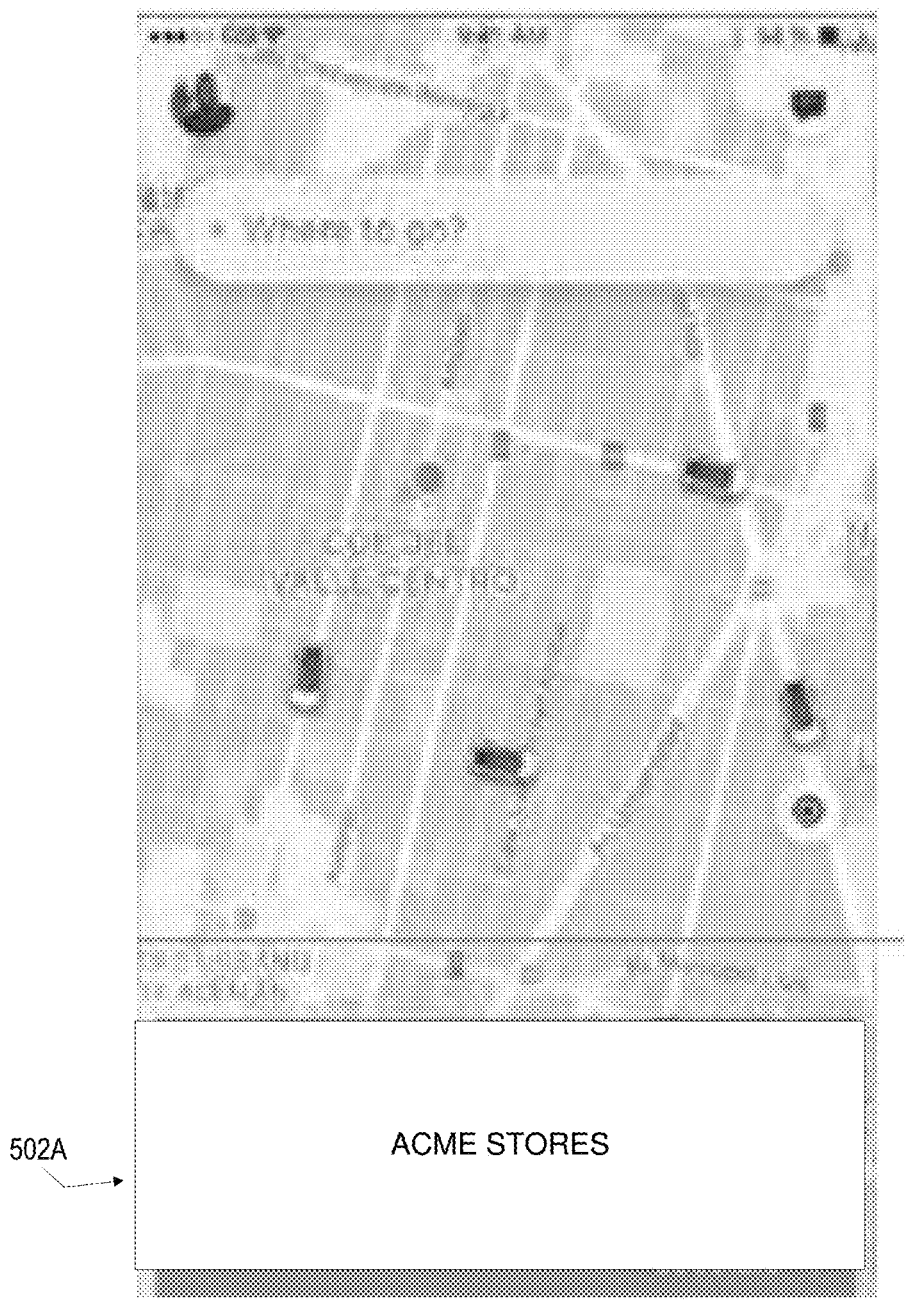
FIGS. 5A-5C illustrate example user interfaces.
Figure 5B:
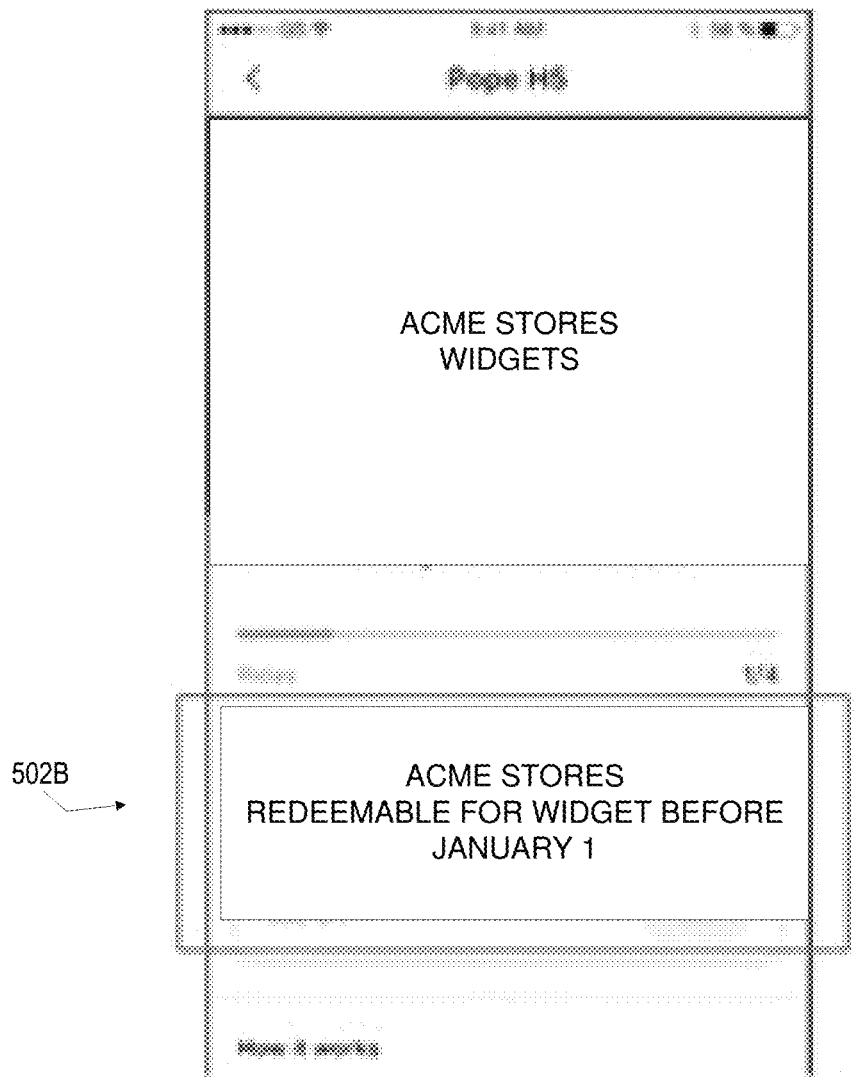
Figure 5C:
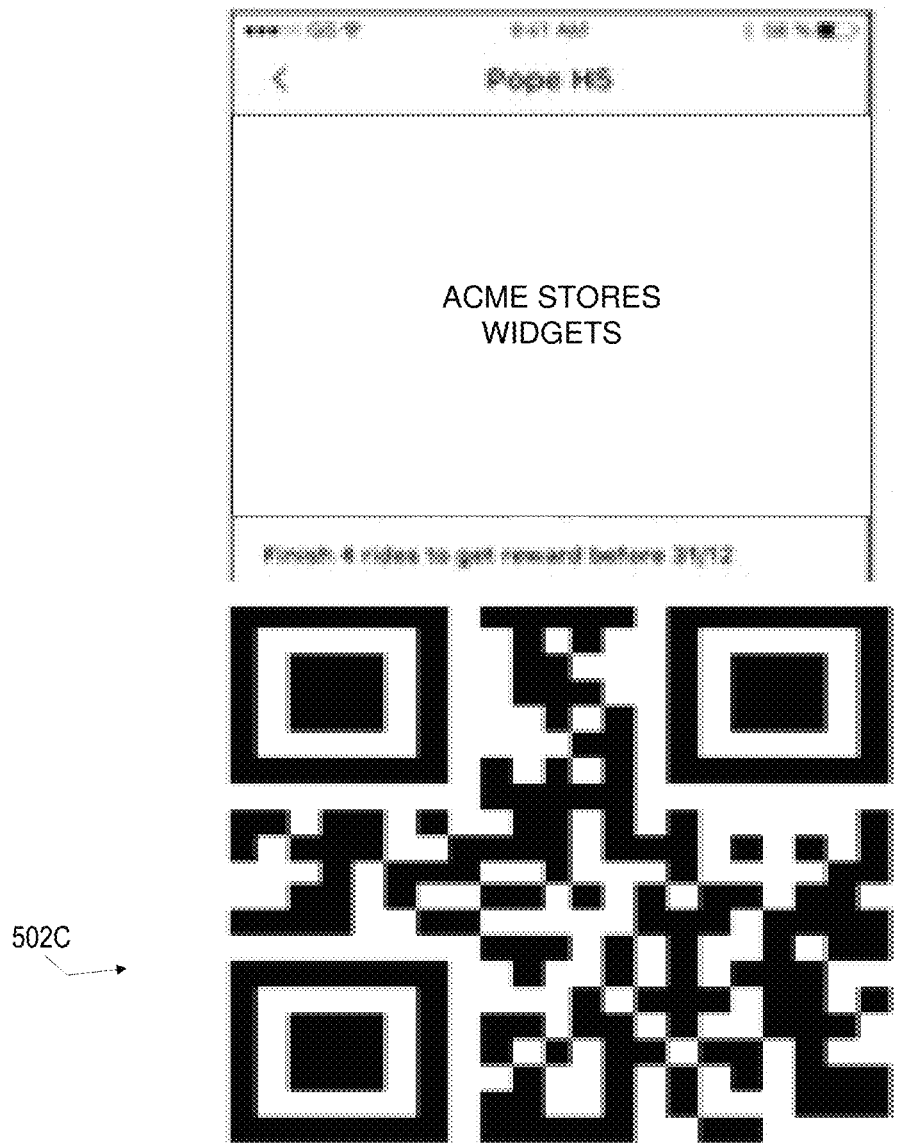

FIGS. 5A-5C illustrate example user interfaces presenting content to a user (e.g., a rider or driver) via a user display device in accordance with processes described herein. FIG. 5A illustrates an item of content 502A displayed in conjunction with a map illustrating a user route. In this example, the item of content 502A displays a name of an establishment for which a token will be offered. The item of content 502A and the timing of its presentation may have been selected in accordance with processes described herein.

In response to the user taking an action (e.g., tapping or otherwise pointing at the item of content 502A), or after a predetermined period of time, or upon the user reaching a geographical location, the user interface illustrated in FIG. 5B may be presented.

Referring to FIG. 5B, a token interface 502B is displayed, including text indicating that the token is redeemable for an item (e.g., a widget) at a specified establishment if redeemed before a specified date. Optionally, if the user selects the token interface 502B (e.g., by tapping on the token interface 502B), the token may be saved in a local and/or remote electronic wallet associated with the user.

Once the user is at the specified establishment, the interface illustrated in FIG. 5C may be presented (e.g., in response to the user selecting the token interface 502B, in response to the user accessing the token from the electronic wallet of the user, automatically in response to the ride sharing app determining that the user display device is at the establishment, and/or the like), including a machine readable code 502C (e.g., a QR), which when scanned/read indicates to the establishment that the user is to be provided with the item in accordance with the token (e.g., for free). The foregoing interactions and redemption may be reported to one or more recipients as discussed elsewhere herein.

Thus, technical solutions are presented that enable the dynamic generation and display of route-related content and that enable the routing of ride sharing vehicles to locations at which there are predicted are actual high level of ride demands.

EXAMPLE EMBODIMENTS

Some example enumerated embodiments are recited in this section in the form of methods, systems, and non-transitory computer-readable media, without limitation.

An aspect of the present disclosure relates to a computer implemented method of selecting route-related content for display during navigation of a route by a ride sharing vehicle, the method comprising: receiving, using a computer system, a ride request from an application hosted on a device of a user, the ride request comprising a pickup location and a destination; routing a vehicle to the pickup location; determining, using the computer system, that the user has been picked up by the vehicle; generating a route configured to navigate the vehicle from the pickup location to the destination; monitoring, using the computer system, sensor data comprising data indicating at least how bumpy the ride is and/or whether a sudden braking event occurred; at least partly in response to identifying, from the sensor data, an adverse ride condition, determining that a content item is to be transmitted to at least one device comprising a display: accessing, using the computer system, a content interaction history for the user; generating, using the computer system, a geofence about the destination based at least in part on the content interaction history for the user; identifying, using the computer system, one or more establishments within the geofence about the destination; at least partly in response to determining that a content item is to be transmitted to at least one device comprising a display, selecting the first item of content based at least in part on the identification of one or more establishments within the geofence about the destination; determining, using the computer system, when the first item of content is to be displayed to the user; causing the selected first item of content to be transmitted over a wireless communication channel to the at least one device; and causing the selected first item of content to be displayed by the at least one device at a time corresponding to the determination as to when the first item of content is to be displayed to the user.

An aspect of the present disclosure relates to a system, comprising: a computing device; a network interface; non-transitory computer readable memory having program instructions stored thereon that when executed by the computing device cause the computing device to: determine that a user has been picked up by a vehicle based a data received via the network interface; access a route configured to navigate the vehicle from a pickup location of the user to a user-specified destination; access a content interaction history for the user; access destination characteristics data; generate a geofence about the destination based at least in part on the content interaction history for the user and the destination characteristics data; identify one or more establishments within the generated geofence about the destination; select a first item of content based at least in part on the identification of one or more establishments within the geofence about the destination and the content interaction history for the user; determine when the first item of content is to be displayed to the user; cause the selected first item of content to be transmitted to the user device; and cause the selected first item of content to be displayed by user device at a time corresponding to the determination as to when the first item of content is to be displayed to the user.

An aspect of the present disclosure relates to a non-transitory computer readable memory having program instructions stored thereon that when executed by a computer system device cause the computer system to performing operations comprising: determine that a user is being transported by a vehicle based received data; access a route configured to navigate the vehicle from a pickup location of the user to a user-specified destination; access a content interaction history for the user; access destination characteristics data; generate a geofence about the destination based at least in part on the content interaction history for the user and the destination characteristics data; identify one or more establishments within the generated geofence about the destination; select a first item of content based at least in part on the identification of one or more establishments within the geofence about the destination; determine when the first item of content is to be displayed to the user; cause the selected first item of content to be transmitted to the user device; and cause the selected first item of content to be displayed by user device at a time corresponding to the determination as to when the first item of content is to be displayed to the user.

An aspect of the present disclosure relates to a computer implemented method of selecting route-related content for display during navigation of a route by a ride sharing vehicle, the method comprising: identifying, using a computer system, a first location where current or predicted ride requests exceed a first threshold within a first time period; using at least driver location information for one or more drivers received over a wireless communication channel, identifying drivers to satisfy the identified current or predicted ride requests at the first location that exceed the first threshold within the first time period; determining, using the computer system, a likelihood that a given identified driver will accept a ride request at the first location within the first time period; at least partly in response to determining that the given identified driver has at least a first likelihood of accepting a ride request at the first location within the first time period, selecting a first item of content to present to the given identified driver, wherein the first item of content is selected based at least in part on a history of establishments frequented by the given identified driver; causing the selected first item of content, the selected first item of content associated with a token, to be presented on a first display to the given identified driver; determining, via a communication received over the wireless communication channel, whether the given identified driver accepted a ride request at the first location within the first time period; and at least partly in response to determining that the given identified driver accepted the ride request at the first location within the first time period, enabling the token to be utilized by the given identified driver at a first entity.

An aspect of the present disclosure relates to a system, comprising: a computing device; a network interface; non-transitory computer readable memory having program instructions stored thereon that when executed by the computing device cause the computing device to: identify a first location where current or predicted ride requests exceed a first threshold within a first time period; use at least driver location information for one or more drivers to identify a driver to satisfy the identified current or predicted ride requests at the first location that exceed the first threshold within the first time period; select a first item of content to present to the identified driver, wherein the first item of content is selected based at least in part on a history of establishments frequented by the identified driver; cause the selected first item of content, the selected first item of content associated with a token, to be presented on a first display to the identified driver; determine whether the identified driver accepted a ride request at the first location within the first time period; and at least partly in response to determining that the identified driver accepted the ride request at the first location within the first time period, enable the token to be utilized by the identified driver at a first entity.

An aspect of the present disclosure relates to a non-transitory computer readable memory having program instructions stored thereon that when executed by a computer system device cause the computer system to performing operations comprising: identify a first location where current or predicted ride requests exceed a first threshold within a first time period; use at least driver location information for one or more drivers to identify a driver to satisfy the identified current or predicted ride requests at the first location that exceed the first threshold within the first time period; select a first item of content to present to the identified driver, wherein the first item of content is selected based at least in part on a history of establishments frequented by the identified driver; cause the selected first item of content, the selected first item of content associated with a token, to be presented on a first display to the identified driver; determine whether the identified driver accepted a ride request at the first location within the first time period; and at least partly in response to determining that the identified driver accepted the ride request at the first location within the first time period, enable the token to be utilized by the identified driver at a first entity.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer implemented method of selecting route-related content for display during navigation of a route by a ride sharing vehicle, the method comprising:
   identifying, using a computer system, a first location where current or predicted ride requests exceed a first threshold within a first time period;
   using at least driver location information for one or more drivers received over a wireless communication channel, identifying drivers to satisfy the identified current or predicted ride requests at the first location that exceed the first threshold within the first time period;
   determining, using the computer system, a likelihood that a given identified driver will accept a ride request at the first location within the first time period, wherein determining the likelihood that a given identified driver will accept a ride request at the first location within the first time period is based at least in part on traffic conditions on at least a portion of a route to the first location of the given identified driver;
   at least partly in response to determining, based at least in part on traffic conditions on at least a portion of a route of the given identified driver, that the given identified driver has at least a first likelihood of accepting a ride request at the first location within the first time period, selecting a first item of content to present to the given identified driver,
   wherein the first item of content is selected to be provided to the given driver based at least in part on:
      a history of establishments frequented by the given identified driver, and
      on the first time period being within a time period where the given identified driver historically does not service ride requests;
   causing the selected first item of content, the selected first item of content associated with a token, to be presented on a first display to the given identified driver;
   determining, via a communication received over the wireless communication channel, whether the given identified driver accepted a ride request at the first location within the first time period; and
   at least partly in response to determining that the given identified driver accepted the ride request at the first location within the first time period, enabling the token to be utilized by the given identified driver at a first entity.

2. The computer implemented method of claim 1, wherein causing the selected first item of content to be presented on the first display to the given identified driver further comprises determining, using sensor data associated with the given identified driver, that the given identified driver is stopped, and wherein the content is caused to be presented on the first display partly in response to the determination that the given identified driver is stopped.

3. The computer implemented method of claim 1, the method further comprising enabling the token to be stored in an electronic wallet associated with the given identified driver.

4. The computer implemented method of claim 1, wherein the first item of content is selected based in part on a historical token interactions by the given identified driver.

5. The computer implemented method of claim 1, wherein identifying a first location where current or predicted ride requests exceed a first threshold within a first time period comprises a prediction of ride requests made using historical ride demand data for the first location.

6. The computer implemented method of claim 1, wherein identifying a first location where current or predicted ride requests exceed a first threshold within a first time period comprises a prediction of ride requests based at least in part on a scheduled event at first location within the first time period.

7. The computer implemented method of claim 1, wherein the first display is positioned in the vehicle.

8. The computer implemented method of claim 1, wherein the first item of content is selected based in part on demographic information for the given identified driver.

9. The computer implemented method of claim 1, wherein the first item of content is selected based in part on a to-do list of the given identified driver.

10. The computer implemented method of claim 1, wherein the first item of content is selected based in part sensor data monitoring the given identified driver's alertness.

11. The computer implemented method of claim 1, wherein the first item of content is selected based in part historical hours of providing ride sharing rides by the identified driver, historical routes driven by the identified driver, and/or rest stops frequented by the identified driver.

12. A system, comprising:
   a computing device;
   a network interface;
   non-transitory computer readable memory having program instructions stored thereon that when executed by the computing device cause the computing device to:
   identify a first location where current or predicted ride requests exceed a first threshold within a first time period;
   use at least driver location information for one or more drivers and a likelihood that a given driver in the one or more drivers will accept a ride request at the first location within the first time period, wherein determining the likelihood that a given identified driver will accept a ride request at the first location within the first time period is based at least in part on traffic conditions on at least a portion of a route to the first location of the given identified driver, to identify a driver to satisfy the identified current or predicted ride requests at the first location that exceed the first threshold within the first time period;
   select a first item of content to present to the identified driver, wherein the first item of content is selected based at least in part on:
      a history of establishments frequented by the identified driver, and
      on the first time period being within a time period where the given identified driver historically does not service ride requests;
   cause the selected first item of content, the selected first item of content associated with a token, to be presented on a first display to the identified driver;
   determine whether the identified driver accepted a ride request at the first location within the first time period; and
   at least partly in response to determining that the identified driver accepted the ride request at the first location within the first time period, enable the token to be utilized by the identified driver at a first entity.

13. The system of claim 12, wherein causing the selected first item of content to be presented on the first display to the identified driver further comprises determining, using sensor data associated with the identified driver, that the identified driver is stopped, and wherein the content is caused to be presented on the first display partly in response to the determination that the identified driver is stopped.

14. The system of claim 12, wherein the first item of content is selected based in part on a historical token interactions by the identified driver.

15. The system of claim 12, wherein identifying a first location where current or predicted ride requests exceed a first threshold within a first time period comprises a prediction of ride requests based at least in part on a scheduled event at first location within the first time period and/or historical ride demand data for the first location.

16. The system of claim 12, wherein the first item of content is selected based in part historical hours of providing ride sharing rides by the identified driver, historical routes driven by the identified driver, and/or rest stops frequented by the identified driver.

17. Non-transitory computer readable memory having program instructions stored thereon that when executed by a computer system device cause the computer system to performing operations comprising:
   identify a first location where current or predicted ride requests exceed a first threshold within a first time period;
   use at least driver location information for one or more drivers and a likelihood that a given driver in the one or more drivers will accept a ride request at the first location within the first time period, wherein determining the likelihood that a given identified driver will accept a ride request at the first location within the first time period is based at least in part on traffic conditions on at least a portion of a route to the first location of the given identified driver to identify a driver to satisfy the identified current or predicted ride requests at the first location that exceed the first threshold within the first time period;
   select a first item of content to present to the identified driver, wherein the first item of content is selected based at least in part on:
      a history of establishments frequented by the identified driver, and
      on the first time period being within a time period where the given identified driver historically does not service ride requests;
   cause the selected first item of content, the selected first item of content associated with a token, to be presented on a first display to the identified driver;
   determine whether the identified driver accepted a ride request at the first location within the first time period; and
   at least partly in response to determining that the identified driver accepted the ride request at the first location within the first time period, enable the token to be utilized by the identified driver at a first entity.

* * * * *